US006398160B1

(12) United States Patent
Hsia

(10) Patent No.: US 6,398,160 B1
(45) Date of Patent: Jun. 4, 2002

(54) INFLATABLE AIRFOILS, AND ELEVATED AND PROPULSION DRIVEN VEHICLES

(76) Inventor: Chih-Yu Hsia, 301 Warren Way, Arcadia, CA (US) 91007

( * ) Notice: Subject to any disclaimer, the term of this patent is extended or adjusted under 35 U.S.C. 154(b) by 0 days.

(21) Appl. No.: 09/617,765

(22) Filed: Jul. 17, 2000

(51) Int. Cl.⁷ .................................................. B64C 3/30
(52) U.S. Cl. .................................... 244/35 R; 244/123
(58) Field of Search ........................ 244/5, 35 R, 117 R, 244/123, 146; 14/274, 275, 276, 277, 278, 279, 280, 281, 282

(56) References Cited

U.S. PATENT DOCUMENTS

| | | | |
|---|---|---|---|
| 3,801,044 A | * | 4/1974 | Moore ........................... 244/5 |
| 3,957,232 A | | 5/1976 | Sebrell |
| 4,725,021 A | | 2/1988 | Priddy |
| 4,858,854 A | | 8/1989 | Jacobson |
| 5,362,017 A | * | 11/1994 | Puckett ....................... 244/146 |
| 5,527,000 A | * | 6/1996 | Tsai et al. .................... 244/116 |
| 6,082,667 A | * | 7/2000 | Haggard ................... 244/35 R |

* cited by examiner

*Primary Examiner*—Peter M. Poon
*Assistant Examiner*—Timothy D. Collins
(74) *Attorney, Agent, or Firm*—William W. Haefliger

(57) ABSTRACT

An aeronautical apparatus, the combination comprising a primary airfoil having at least one panel which is an upper panel, a lower panel, and multiple gas containing tubes associated with the airfoil and extending lengthwise thereof, the tubes including relatively larger cross-section tubes positioned chordwise of the airfoil, and relatively smaller cross-section positioners located to stabilize the relatively larger cross-section tubes.

31 Claims, 37 Drawing Sheets

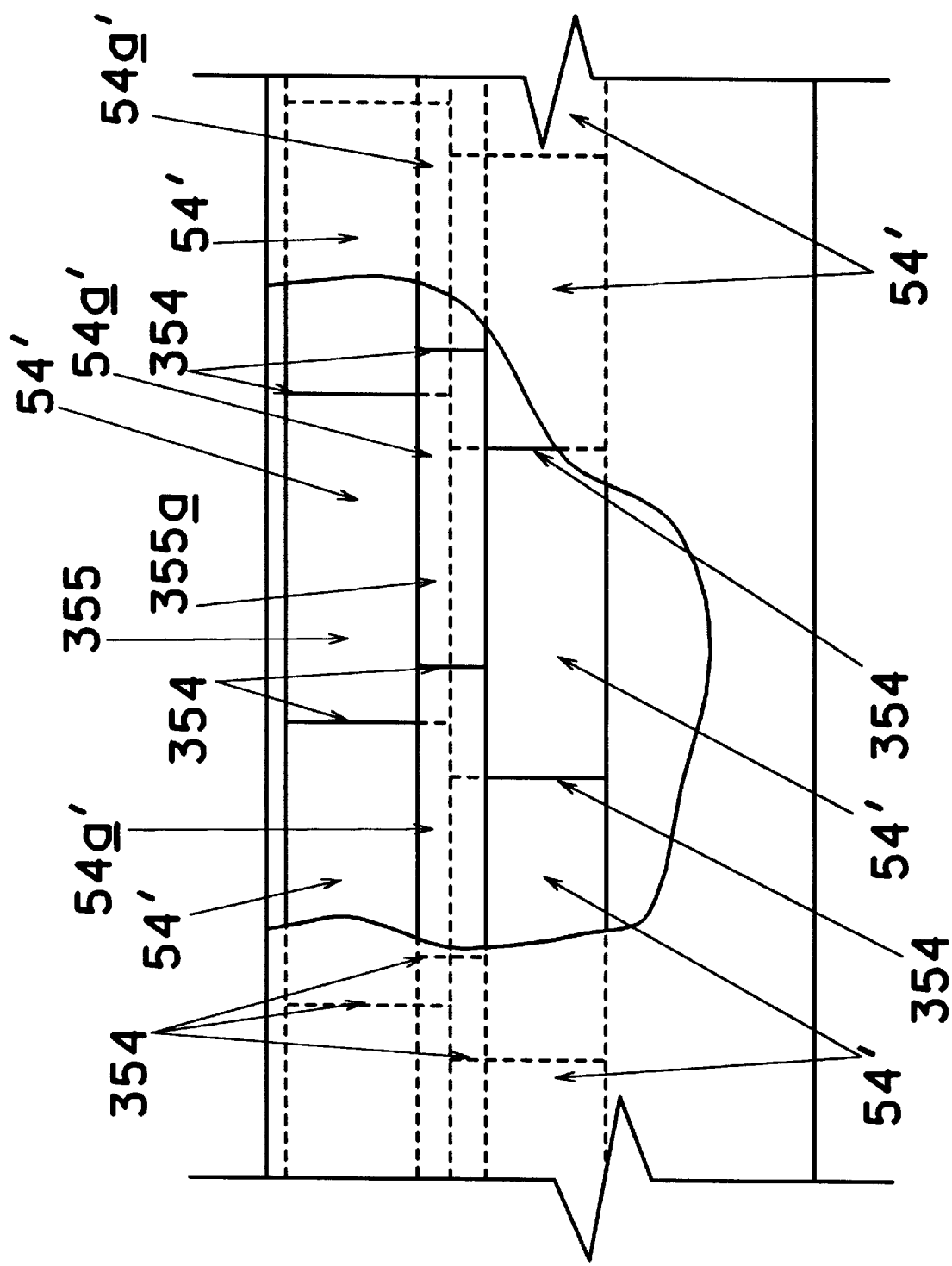

INFLATABLE AIRFOILS, AND ELEVATED AND PROPULSION DRIVEN VEHICLES

BACKGROUND OF THE INVENTION

This invention relates generally to aeronautical apparatus, and more particularly to inflated structure that form airfoils containing inflated tubing, configured to provide lift when propelled forwardly, for lifting various loads.

There is need for simple, inflatable structure that, when propelled forwardly, will provide lift for various loads, as for recreational and other purposes. No prior aeronautical apparatus of which I am aware provides the unusually advantageous features of construction, modes of operation, and results, as are provided by the apparatus disclosed herein, for meeting the described need.

SUMMARY OF THE INVENTION

It is a major object of the invention to provide improved aeronautical apparatus meeting the above need, and embodying advantageous structures as will appear. Basically the apparatus of the invention comprises:

a) a primary airfoil, having at least one panel which is
   i) an upper panel
   ii) a lower panel
b) multiple inflated tubes protectively associated with the airfoil and extending lengthwise thereof,
c) the tubes including
   i) relatively larger cross-section tubes positioned chordwise of the airfoil,
   ii) relatively smaller cross-section tubes positioned to stabilize such relatively larger diameter tubes.

As will appear, the smaller cross-section tubes are spaced apart about at least some of the larger cross section tubes, to provide airfoil stability. At least some of the smaller diameter tubes are connected to at least some of the larger diameter tubes.

Another object is to provide the airfoil to have opposite ends and including chordwise extending structures at such opposite ends and connected to one or more of the following:

i) the upper panel
   ii) the lower panel
   iii) ends of the relatively larger diameter tubes
   iv) ends of the relatively smaller diameter tubes.

Such chordwise extending structures may be inflated, and are connected to ends of one or more of the following:

i) the upper panel
   ii) the lower panel
   iii) ends of the relatively larger diameter tubes
   iv) ends of the relatively smaller diameter tubes.

Such end structures typically and advantageously project generally forwardly of a line defined by the generally lengthwise extending leading edge of the airfoil, and also project generally rearwardly of a line defined by the generally lengthwise extending trailing edge of the airfoil.

Another object is to provide tethers supported by the airfoil, those tethers supporting loading, as for example may include recreational vehicles or elements.

A further object is to provide an intermediate chordwise extending inflatable structure located between such airfoil opposite ends, and projecting forwardly and rearwardly of the airfoil. As will be seen the airfoil may be configured to be laterally generally straight, or may have swept-back V shape at opposite sides of the intermediate structure. That intermediate structure may carry flight control structure or surfaces located rearwardly of the airfoil and extending transversely relative to said structures. The flight control surface may include one of the following:

i) a panel or panels
   ii) a secondary airfoil or airfoils.

One of such surfaces may comprise a rudder, and it may in turn include internal inflatable tubing.

An additional object is to provide at least some of the airfoil tubing to comprise tubular sections having gas filled compartmental interiors there being walls in the tubes blocking gas flow communication between said interiors.

Further, the airfoil internal tubings may include both larger cross-section tubes and smaller cross-section tubes extend proximate said at least one panel in supporting relation therewith; and the tubing supported panel may comprise an upper panel or membrane, which is the only such membrane, and i.e. the tubings are downwardly exposed.

Yet another object is to provide flight controls operatively connected to said control panel or panels to controllably tilt same.

A yet further object is to provide at least one of the following loads to be tether supported by the inflatable airfoil:

a) a seat for a human rider,
   b) a wheeled vehicle,
   c) a ski or skis,
   d) a boat,
   e) a skid or skids,
   f) a boat hull and a hydrofoil or hydrofoils carried by the hull.

Propeller apparatus associated with such loads may comprise one of the following:

i) a propeller and a drive therefor,
   ii) a rocket
   iii) a ground surface engaging wheel or wheels and a drive therefor.

Selector mechanism may be provided to enable the operator to select which of several propulsion systems is to be employed.

An added object is to provide a novel and useful combination of structural elements comprising:

a) a wheeled vehicle to be propelled by pedaling, and including pedal driven mechanism,
   b) a propeller carried by the vehicle to be rotated in response to pedaling, thereby to provide thrust to propel the vehicle forwardly,
   c) an airfoil operatively connected to the vehicle to exert lift in response to forward propulsion of the vehicle.

As will be seen, at least one gas container may be associated with the vehicle, and may be located in the airfoil whereby buoyant gas supplied to the interior of the container or containers will exert lift transmitted to the airfoil and to the vehicle; and such lift may be sufficient to substantially overcome the weight of the vehicle.

These and other objects and advantages of the invention, as well as the details of an illustrative embodiment, will be more fully understood from the following specification and drawings, in which:

DRAWING DESCRIPTION

Figure 1:
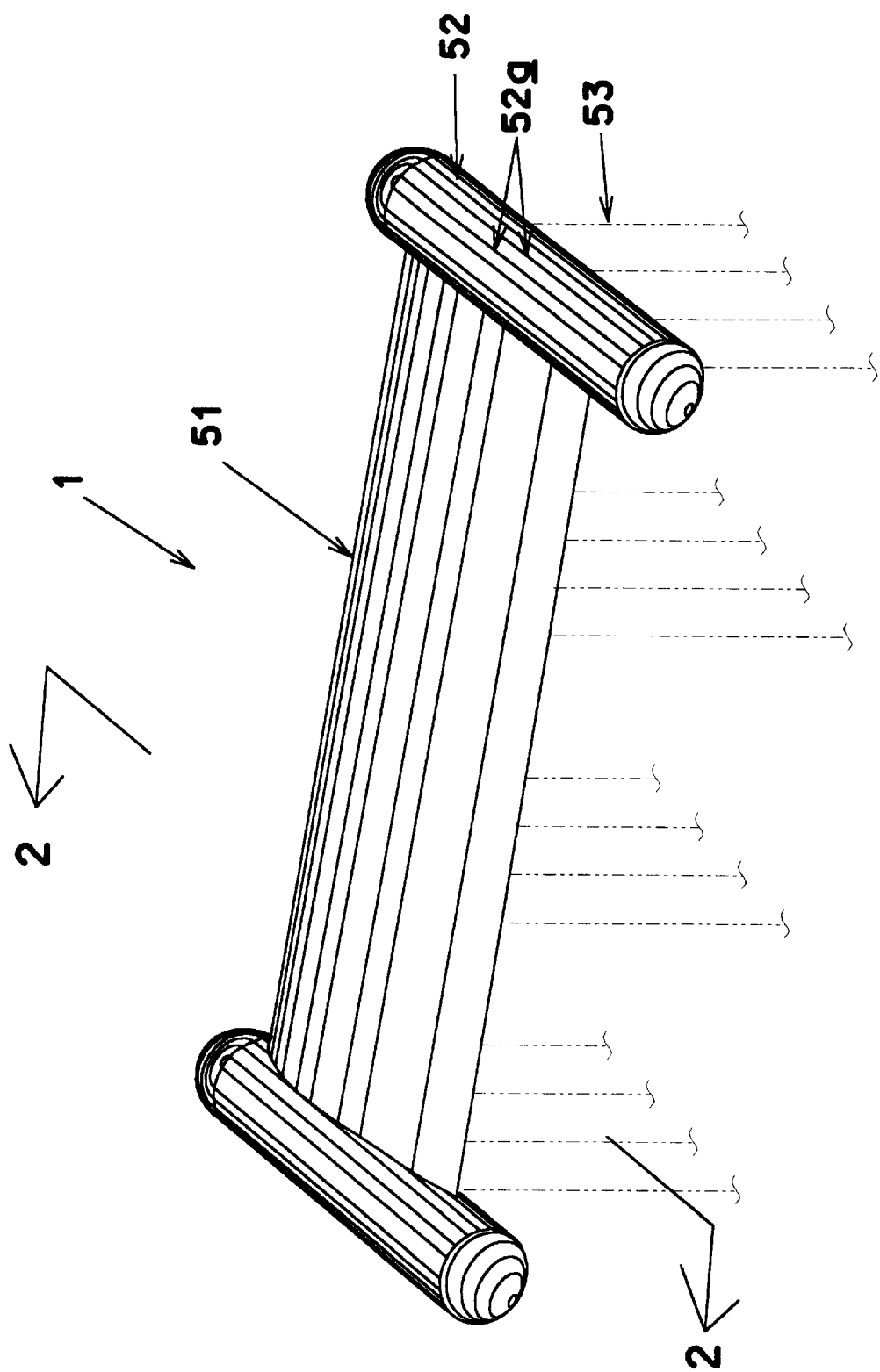
FIG. 1 is an isometric view of one variation of an inflatable airfoil embodying the invention.
Figure 2:
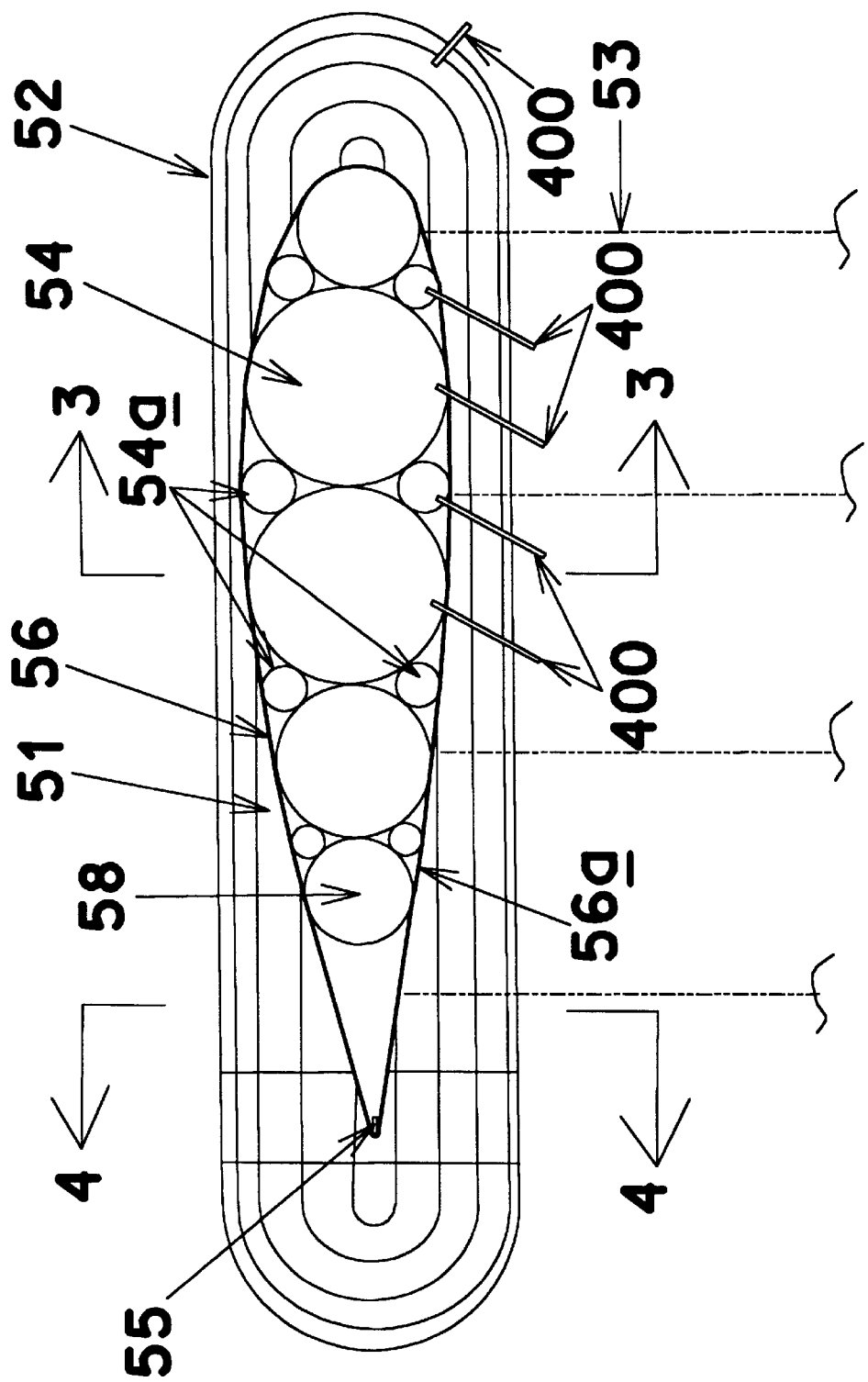
FIG. 2 is a variation of a sectional view of the inflatable airfoil shown in FIG. 1.
Figure 3:
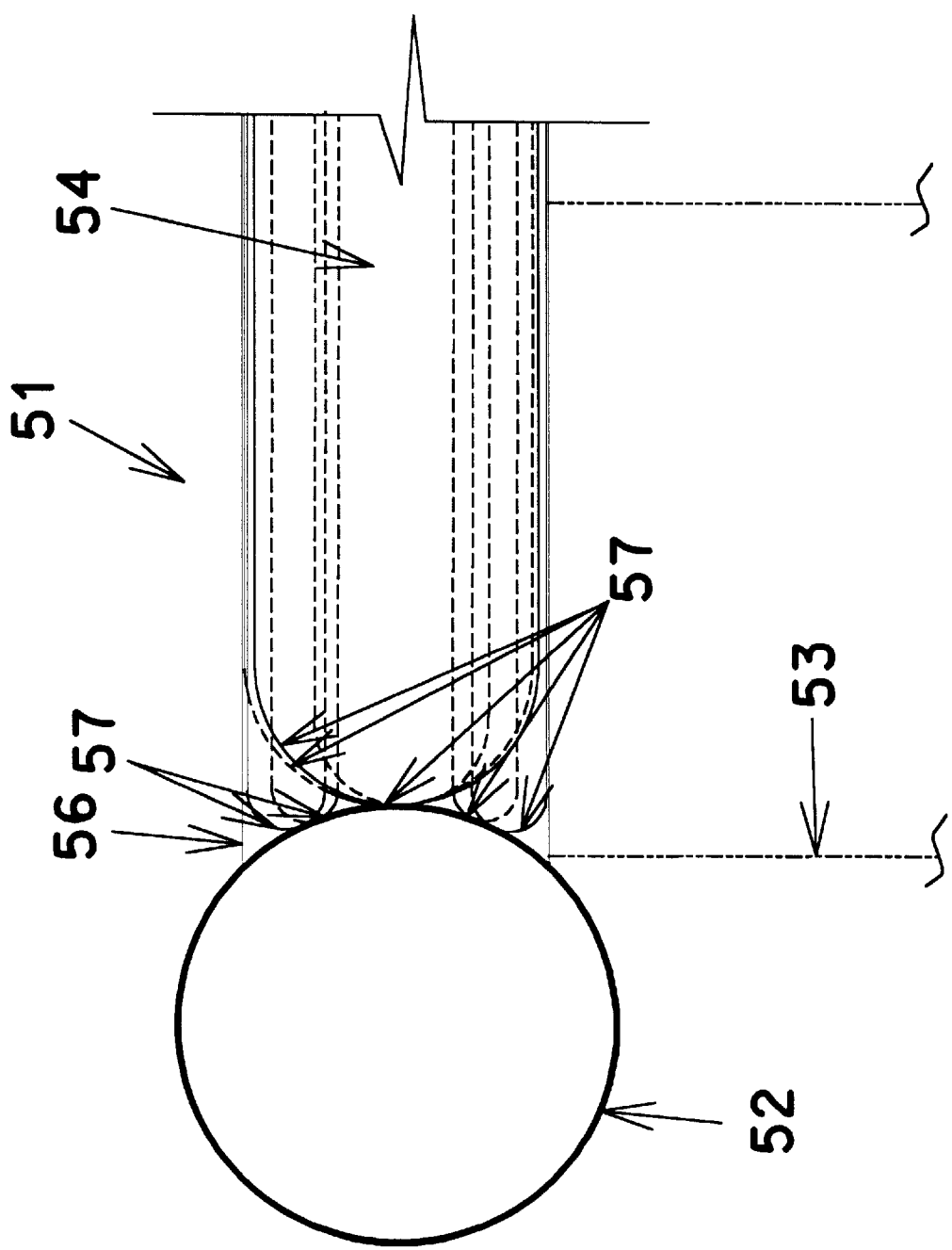
Figure 4:
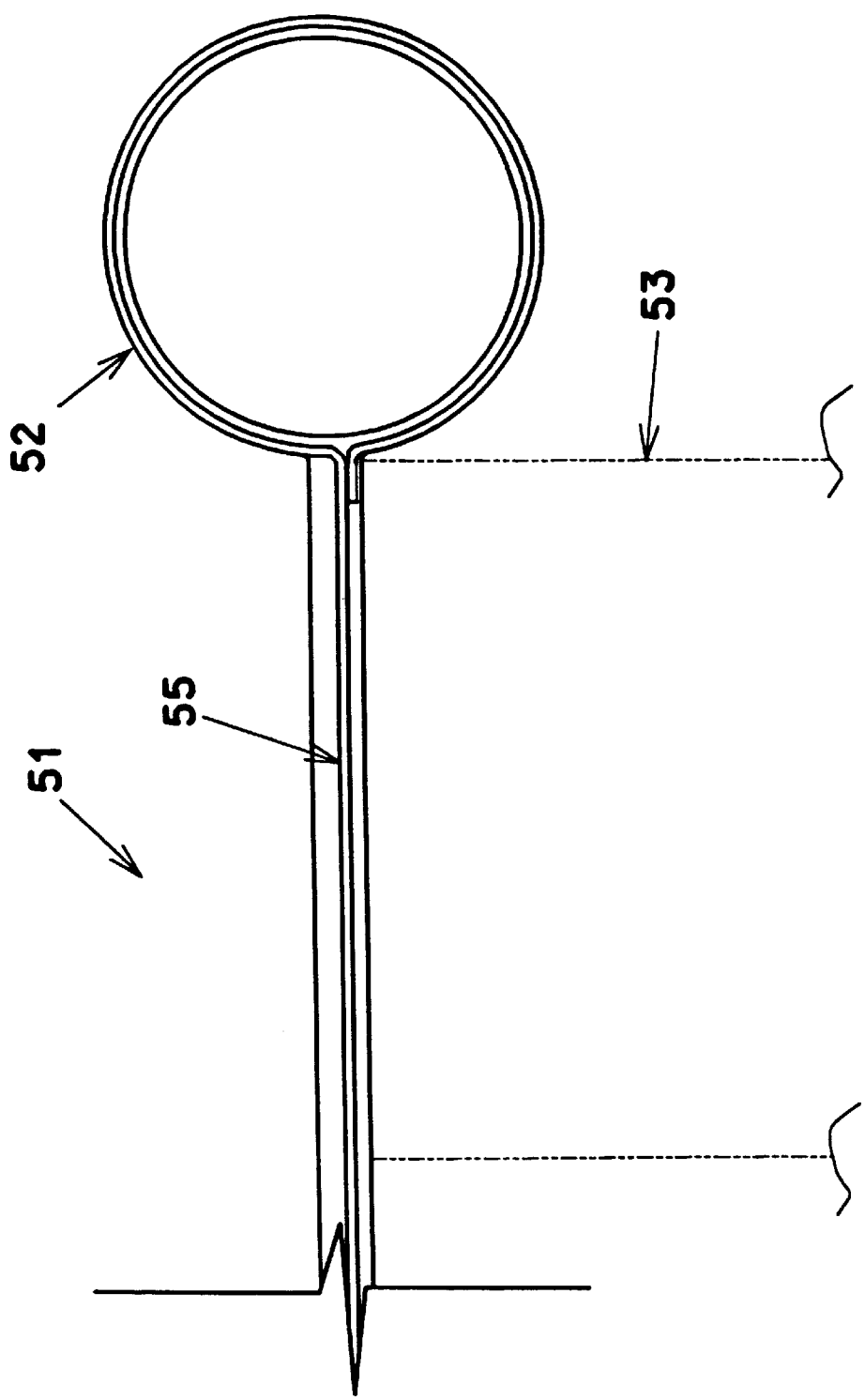
Figure 5:
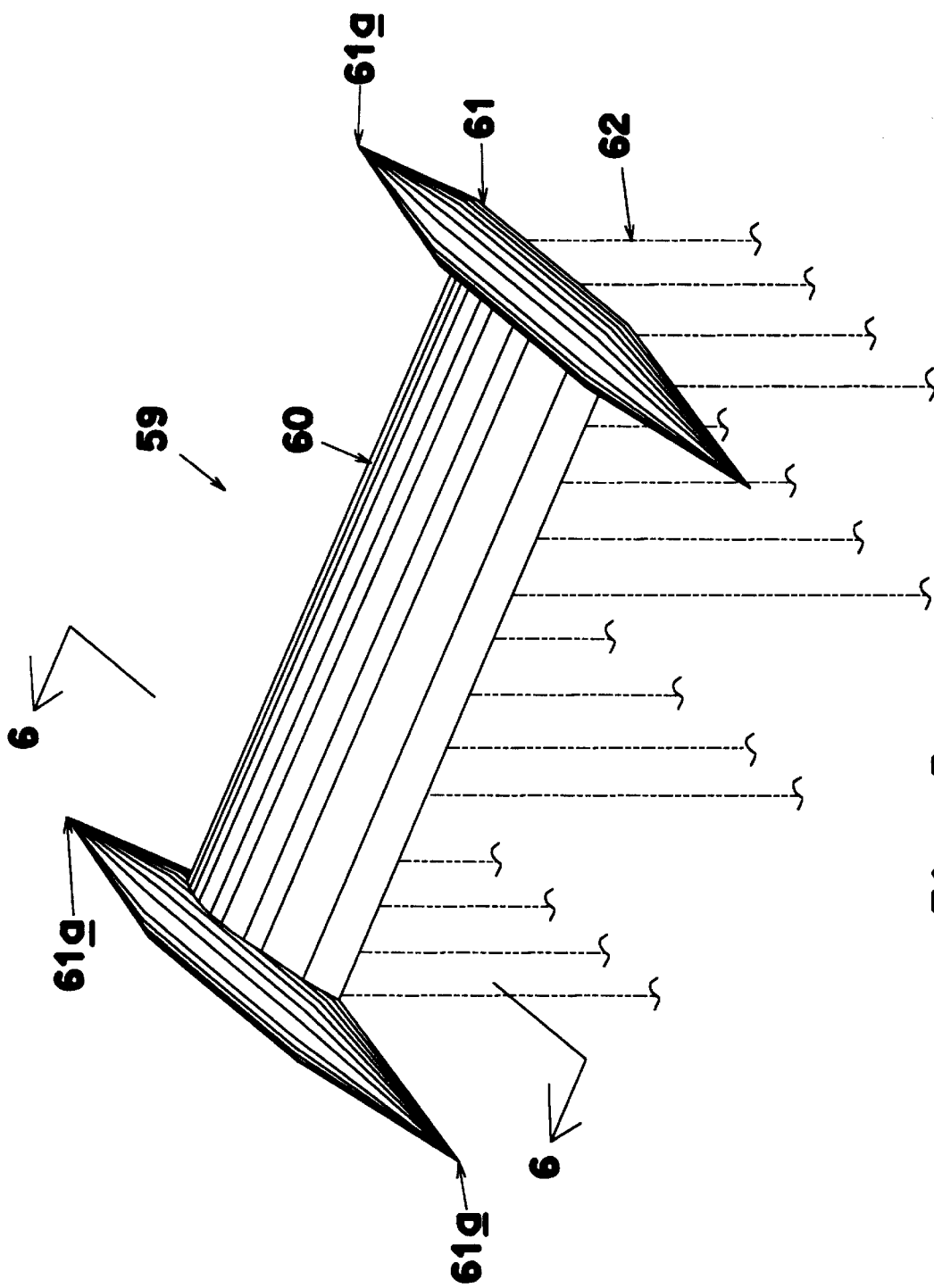
Figure 6:
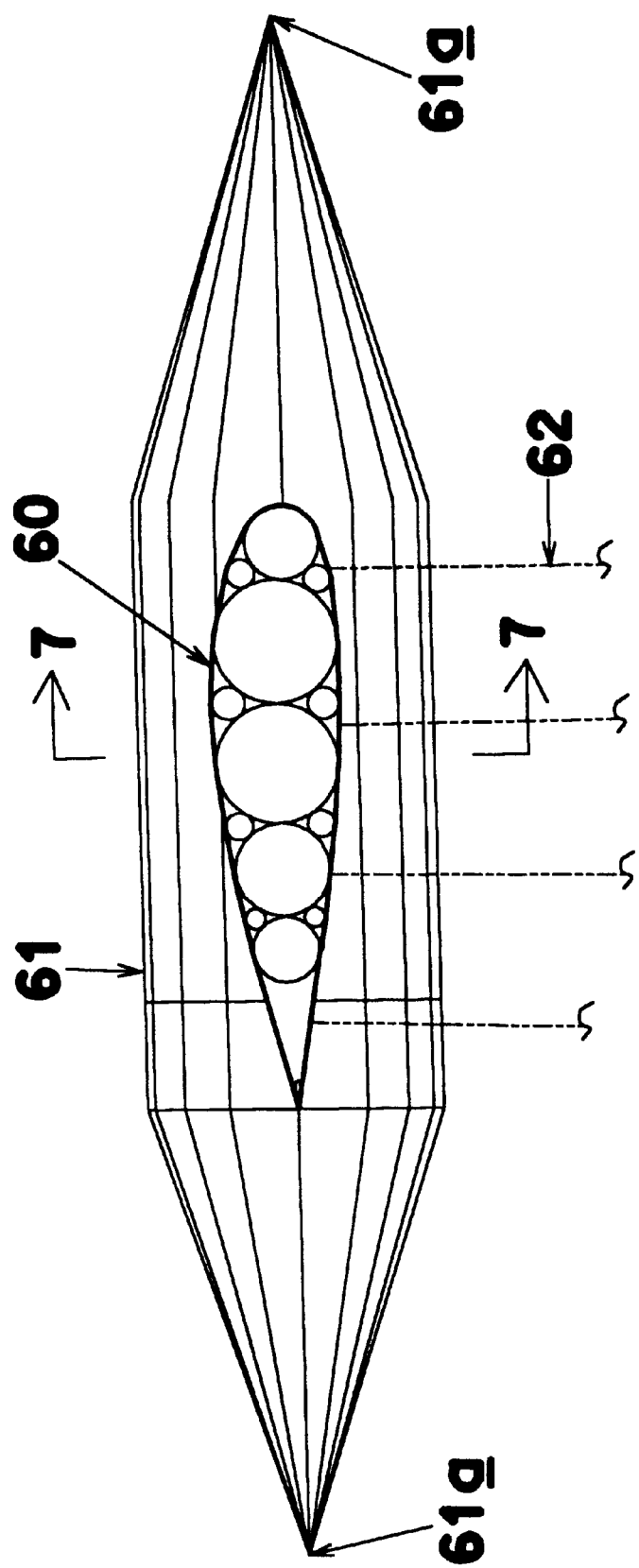
Figure 7:
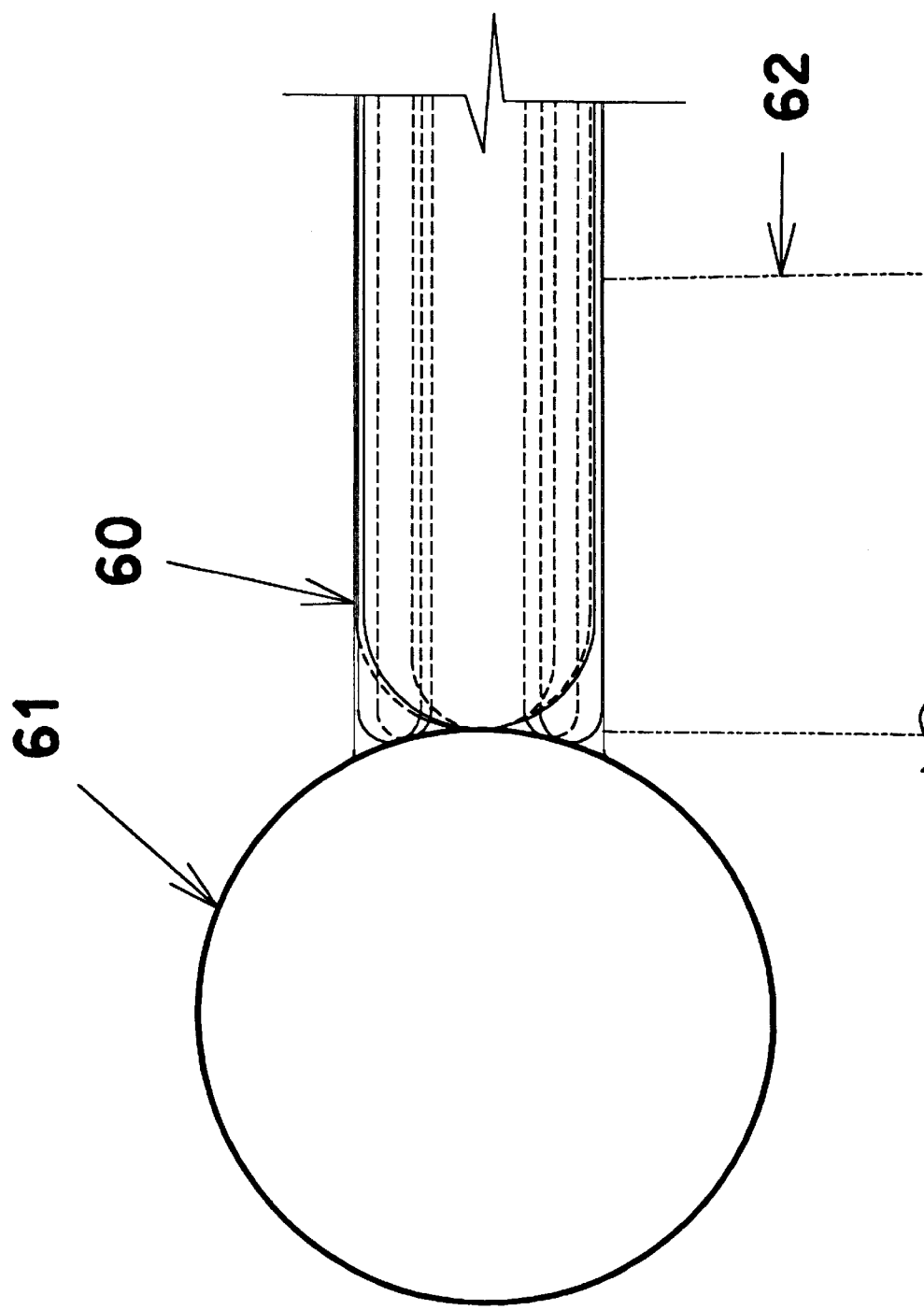
Figure 11:
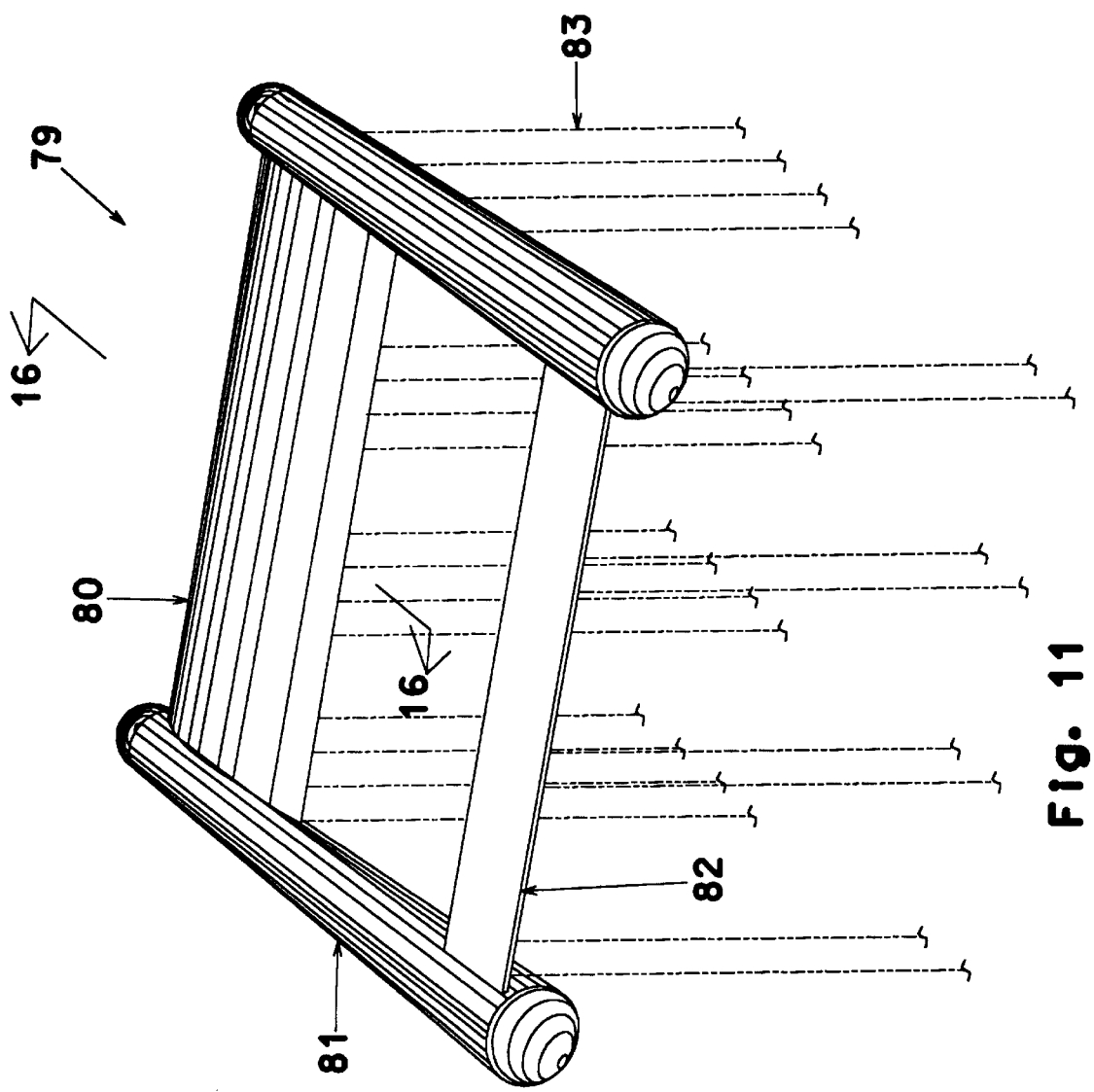
Figure 13:
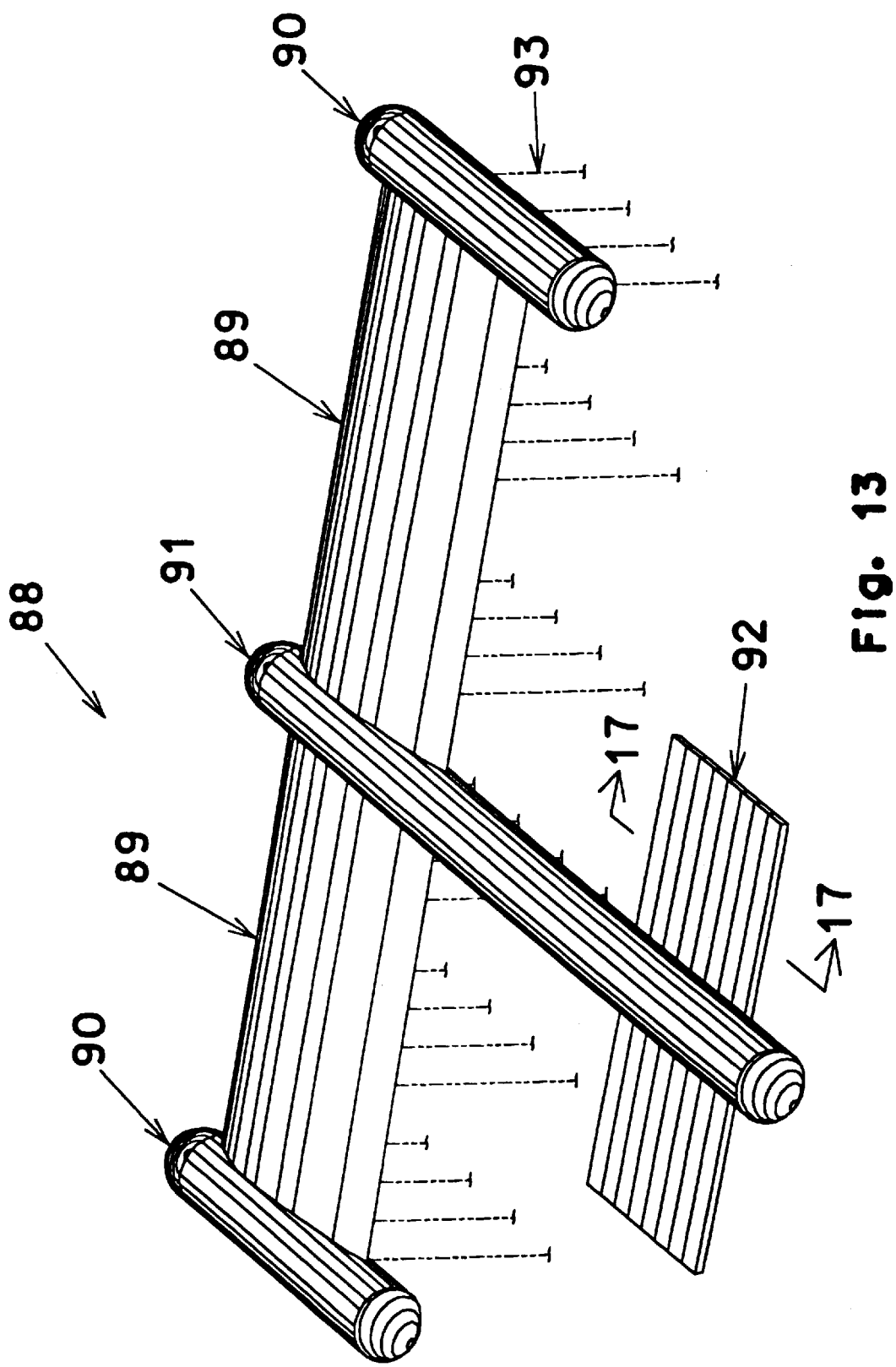
Figure 14:
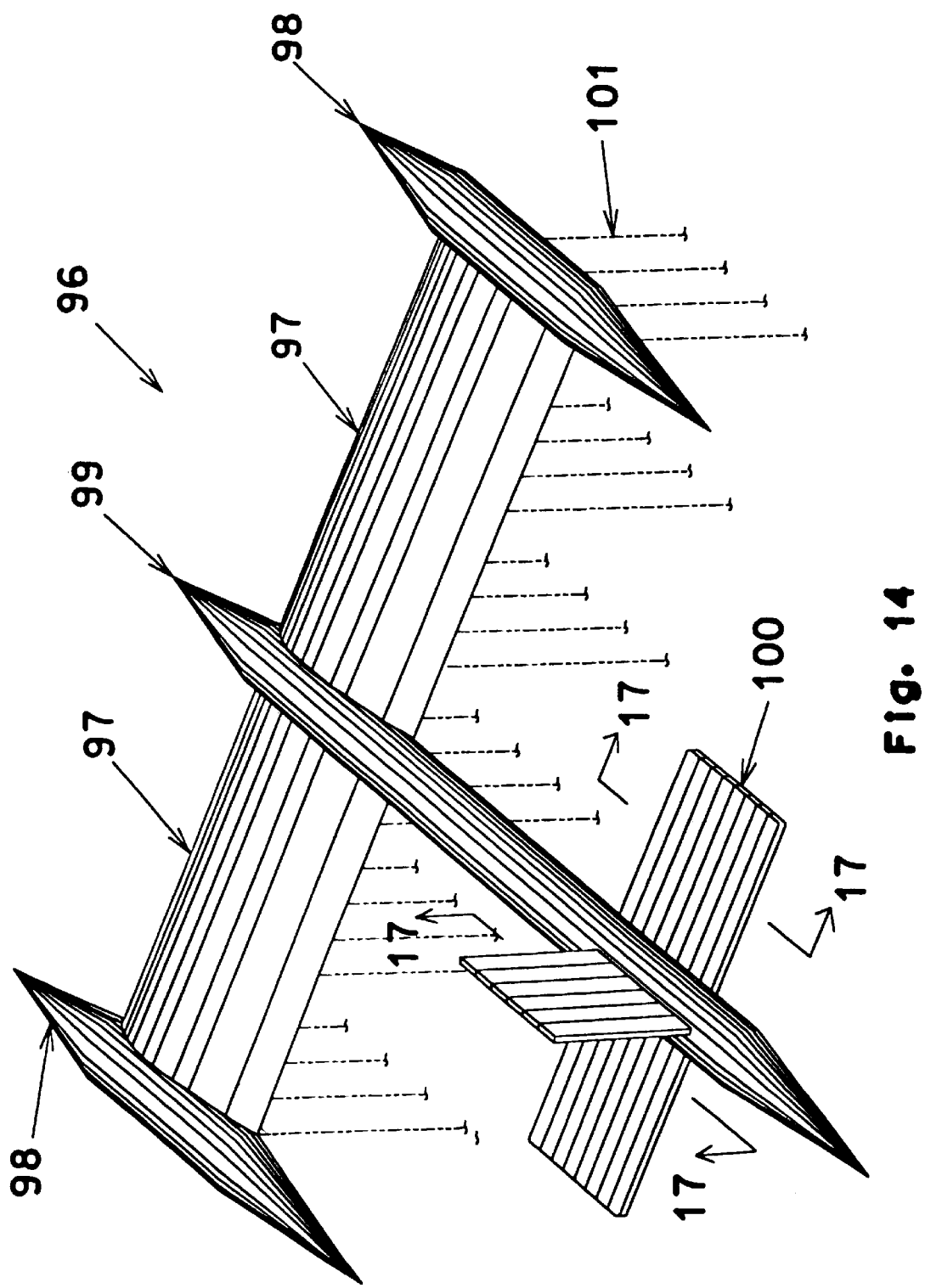
Figure 15:
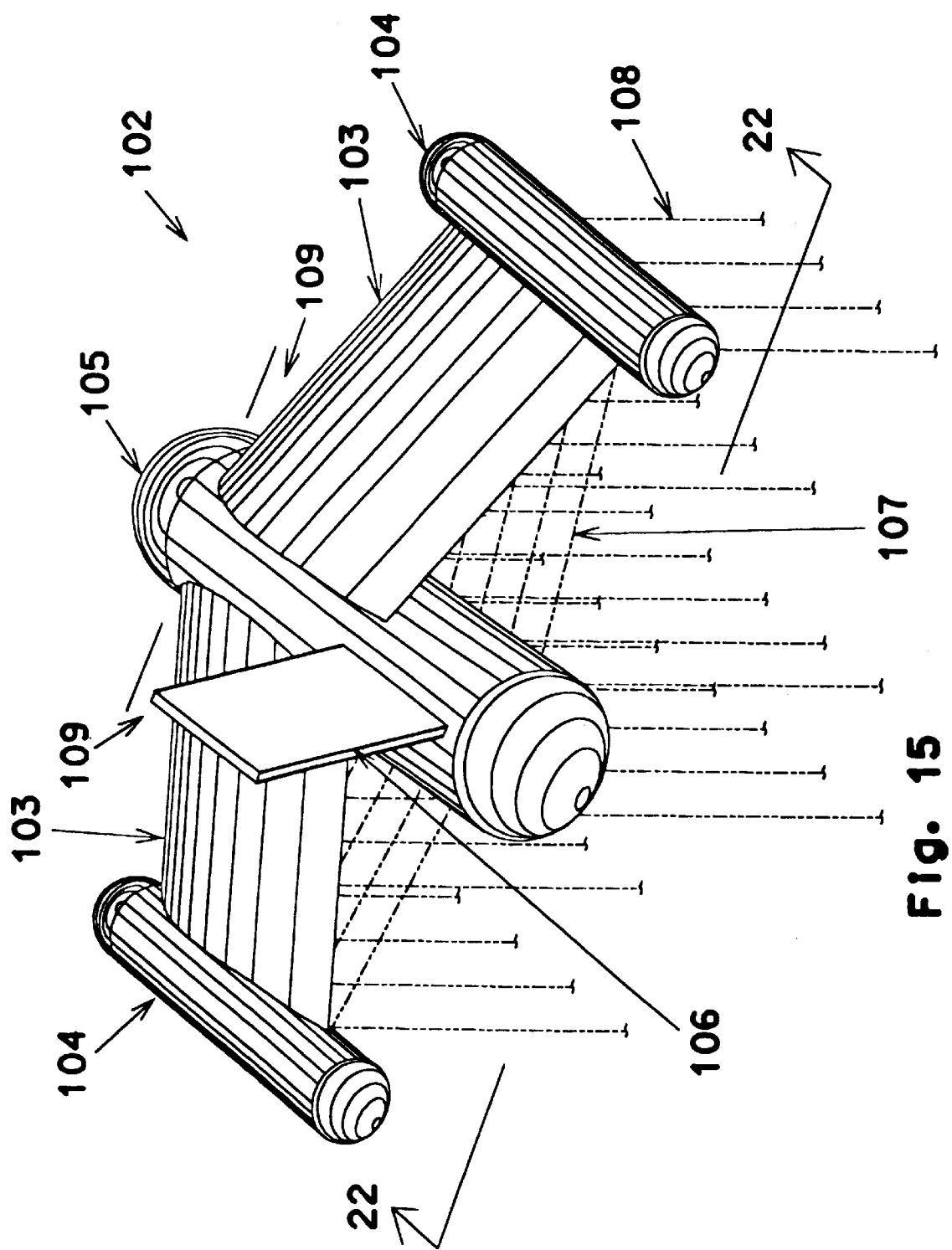
Figure 16:
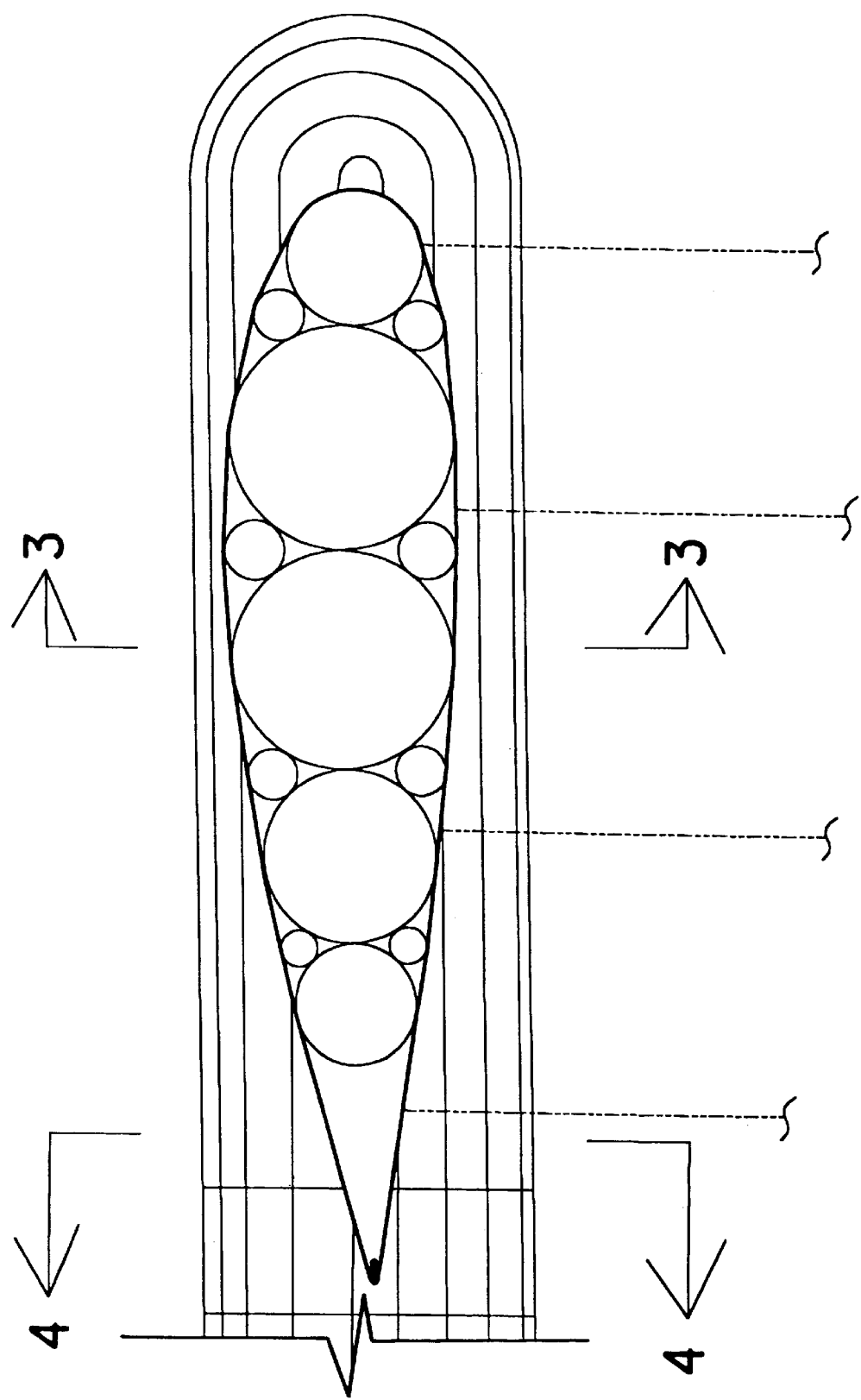
Figure 17:
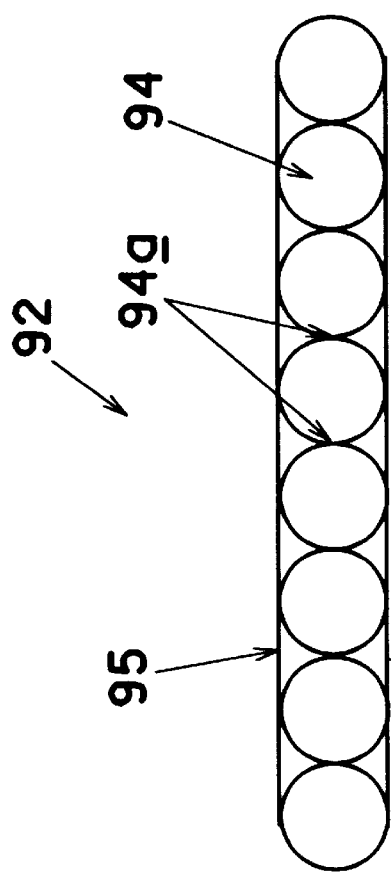
Figure 18:
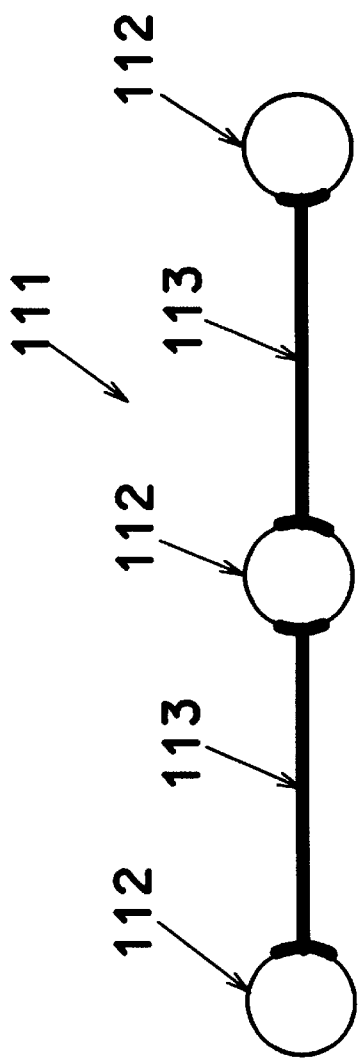
Figure 19:
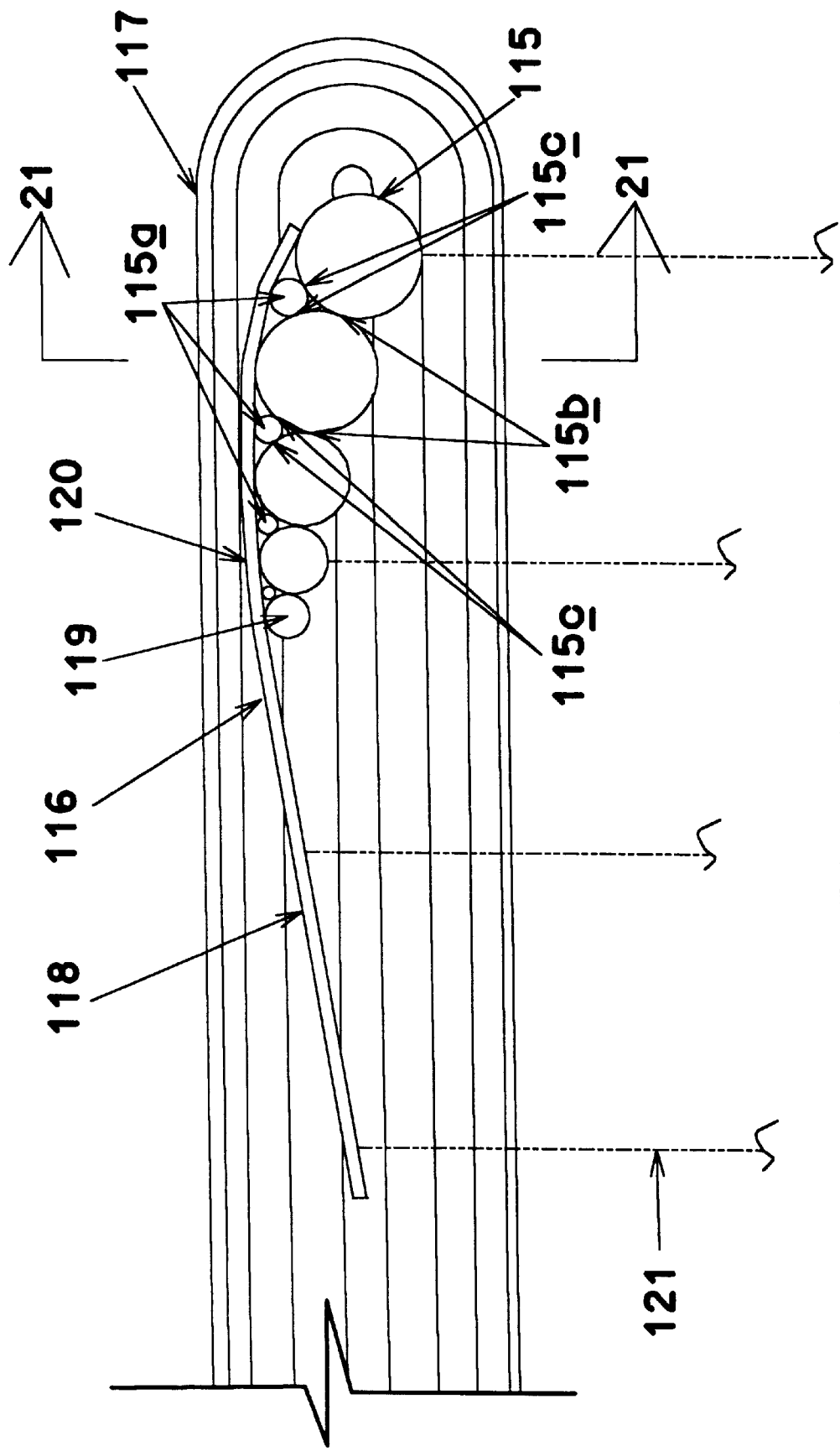
Figure 20:
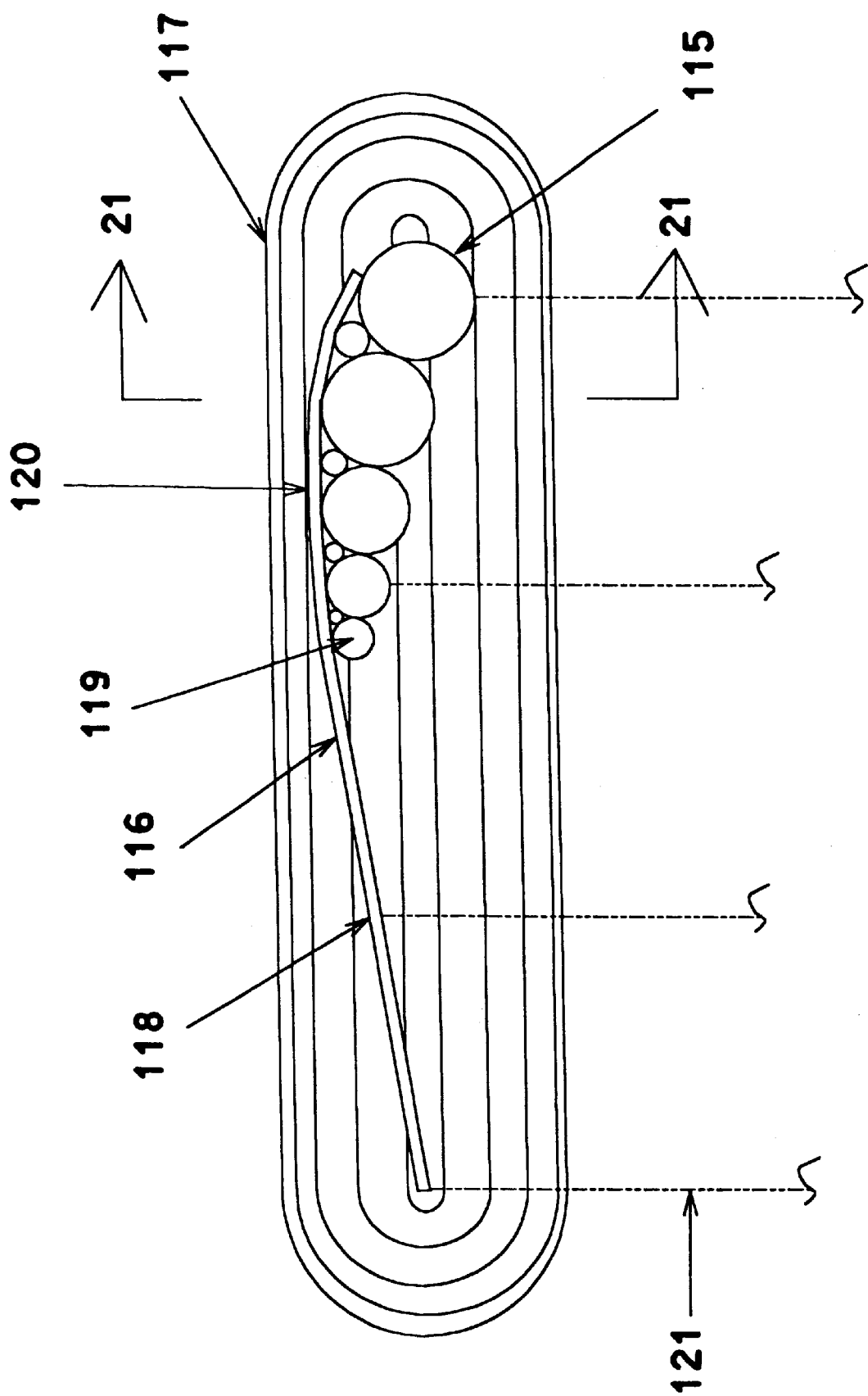
Figure 21:
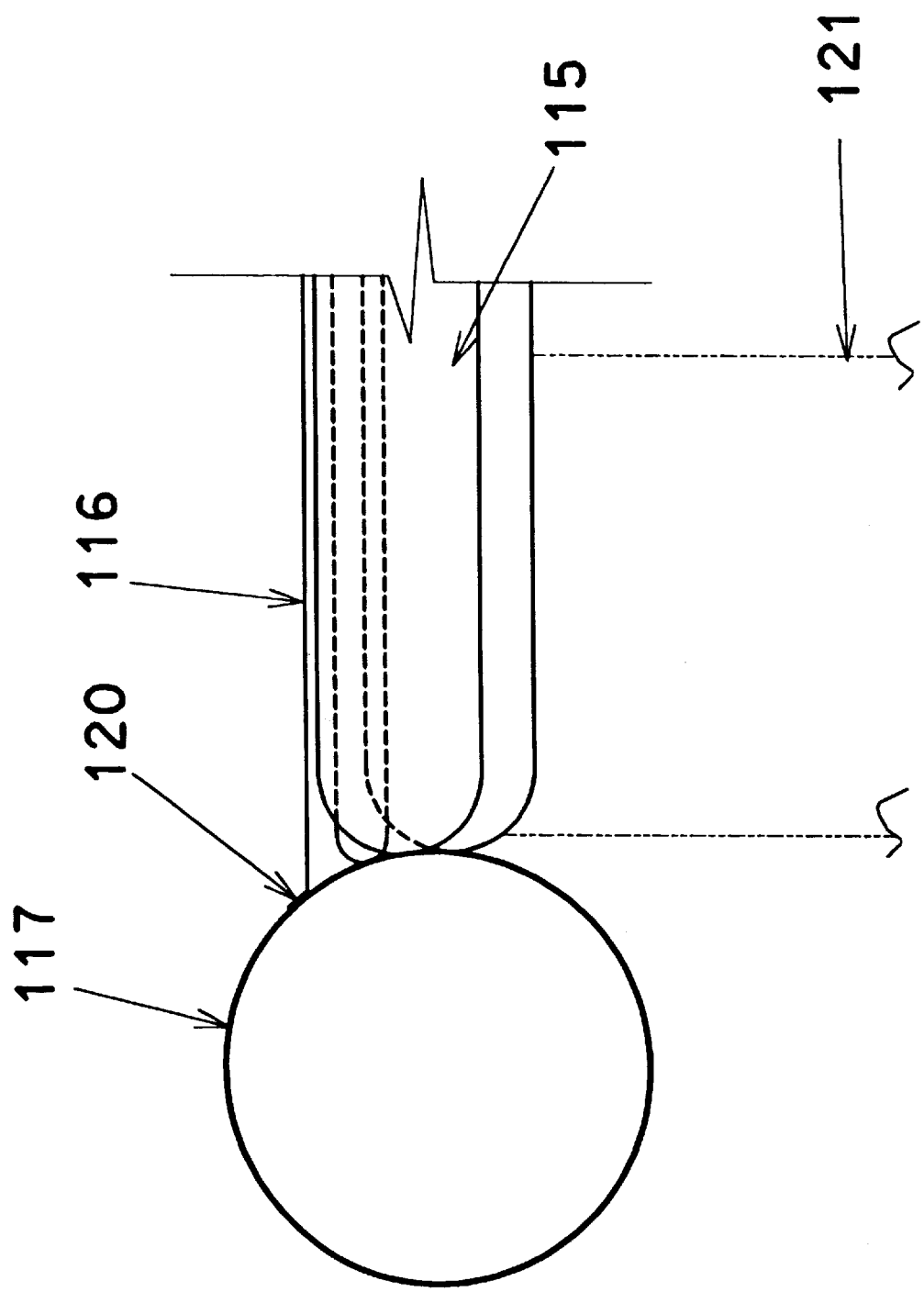
Figure 22:
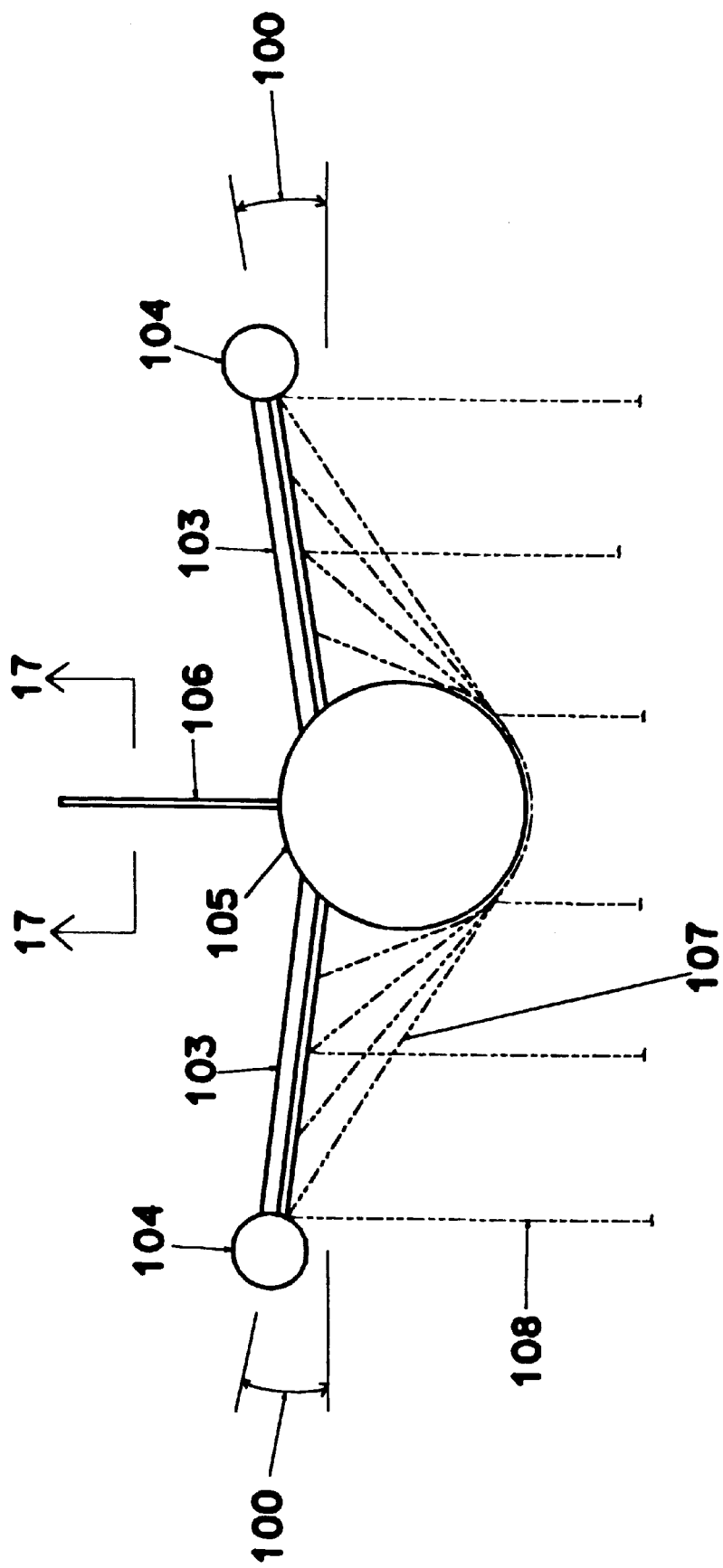
Figure 23:
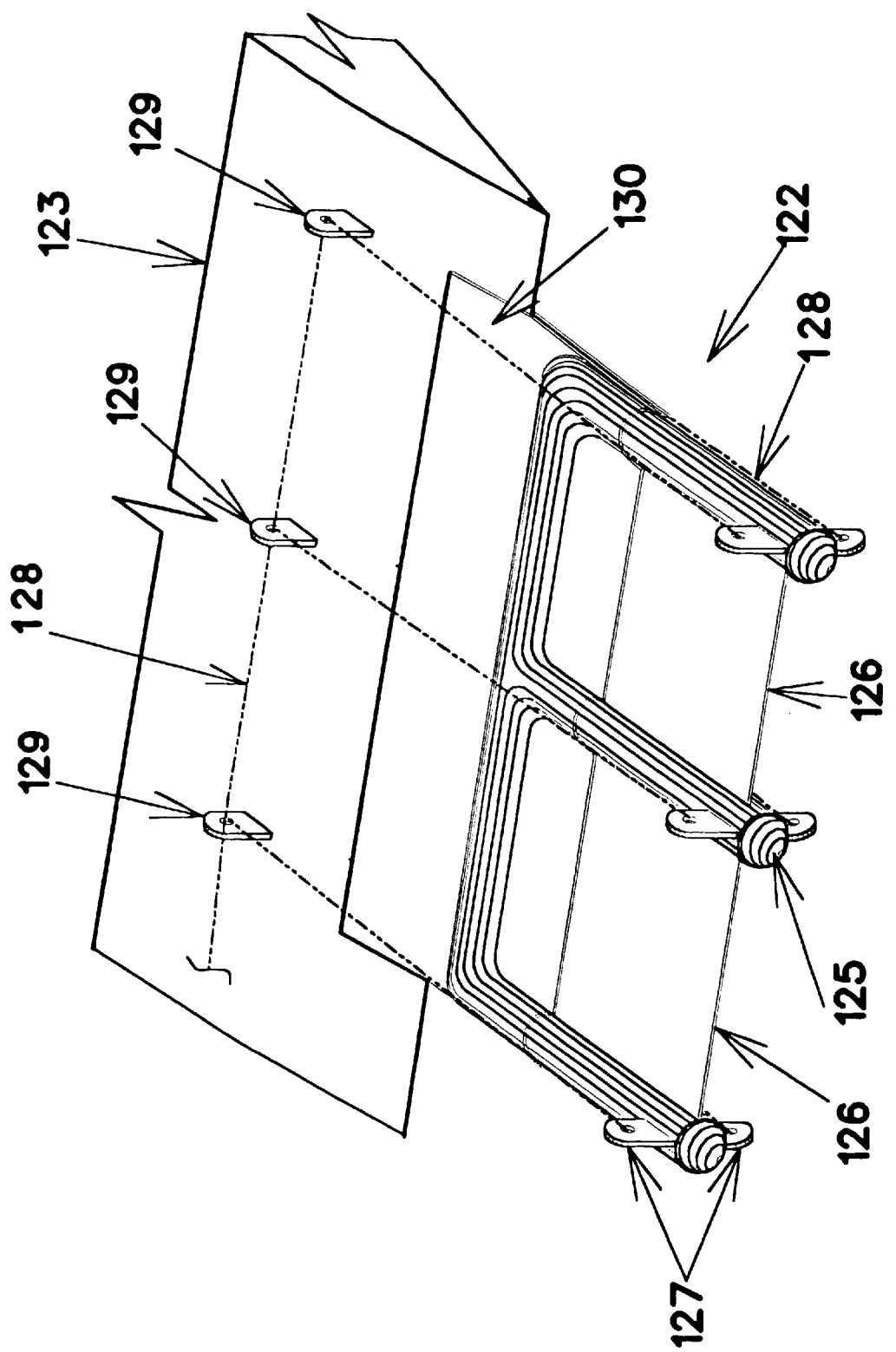
Figure 24:
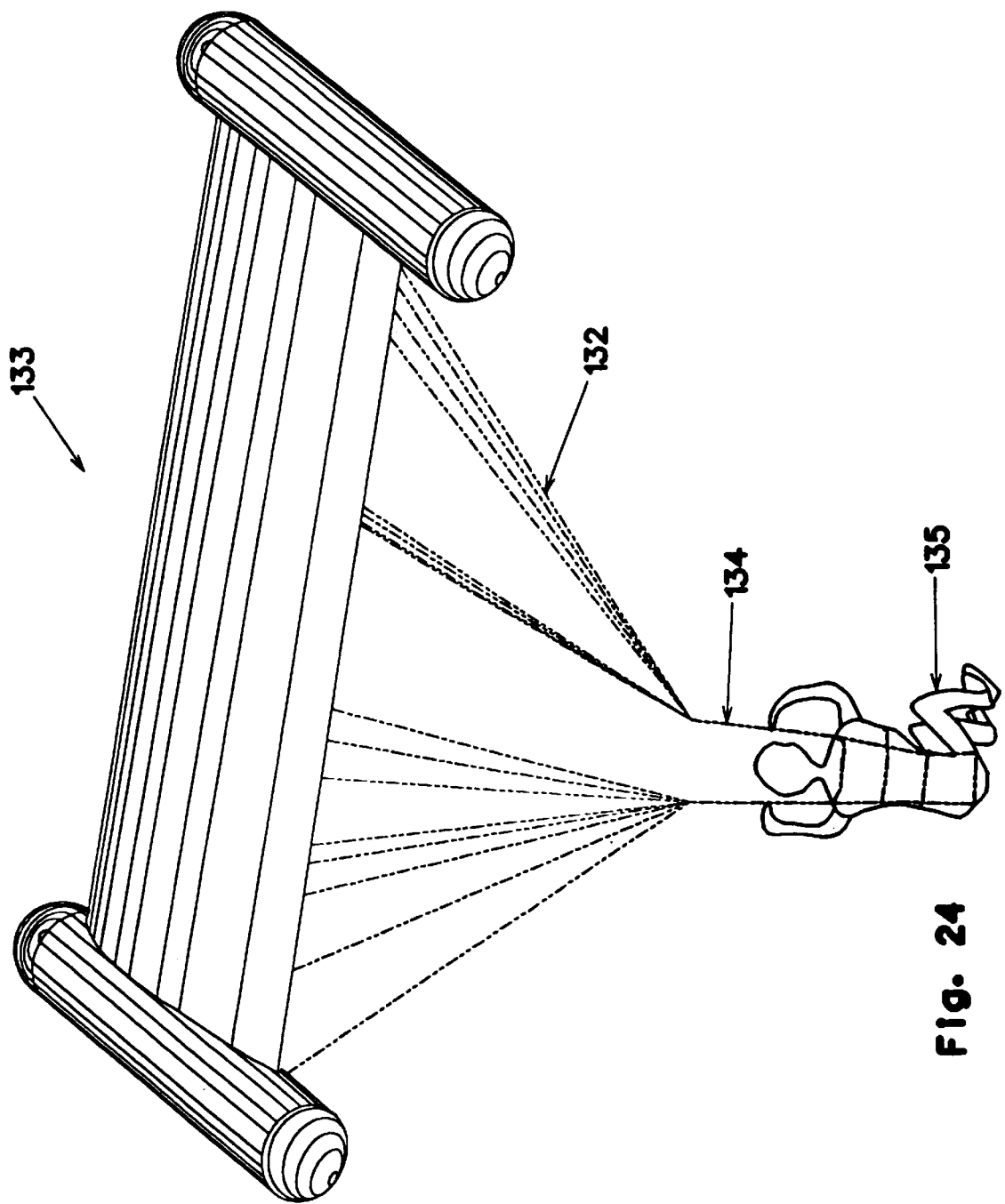
Figure 25:
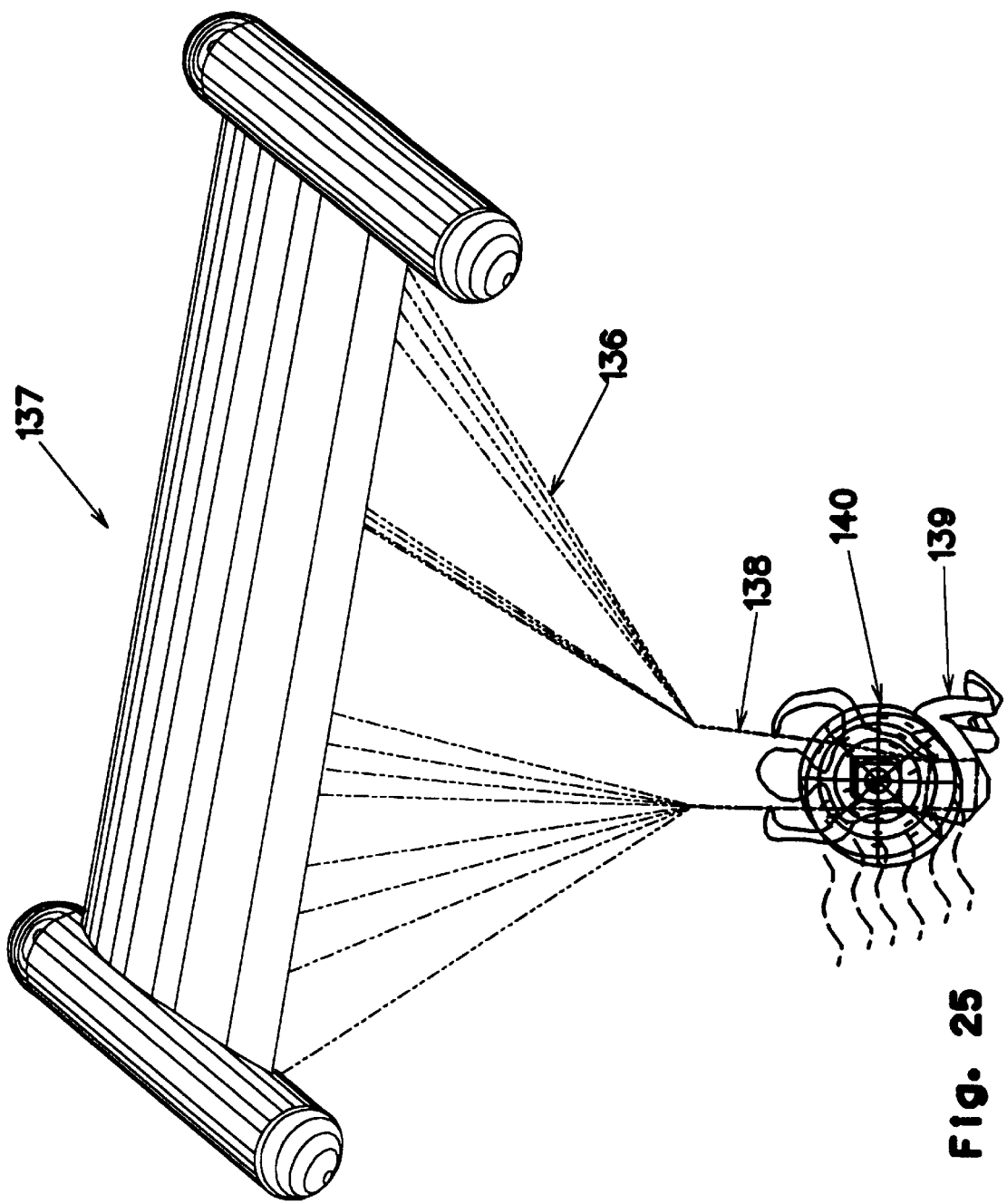
Figure 26:
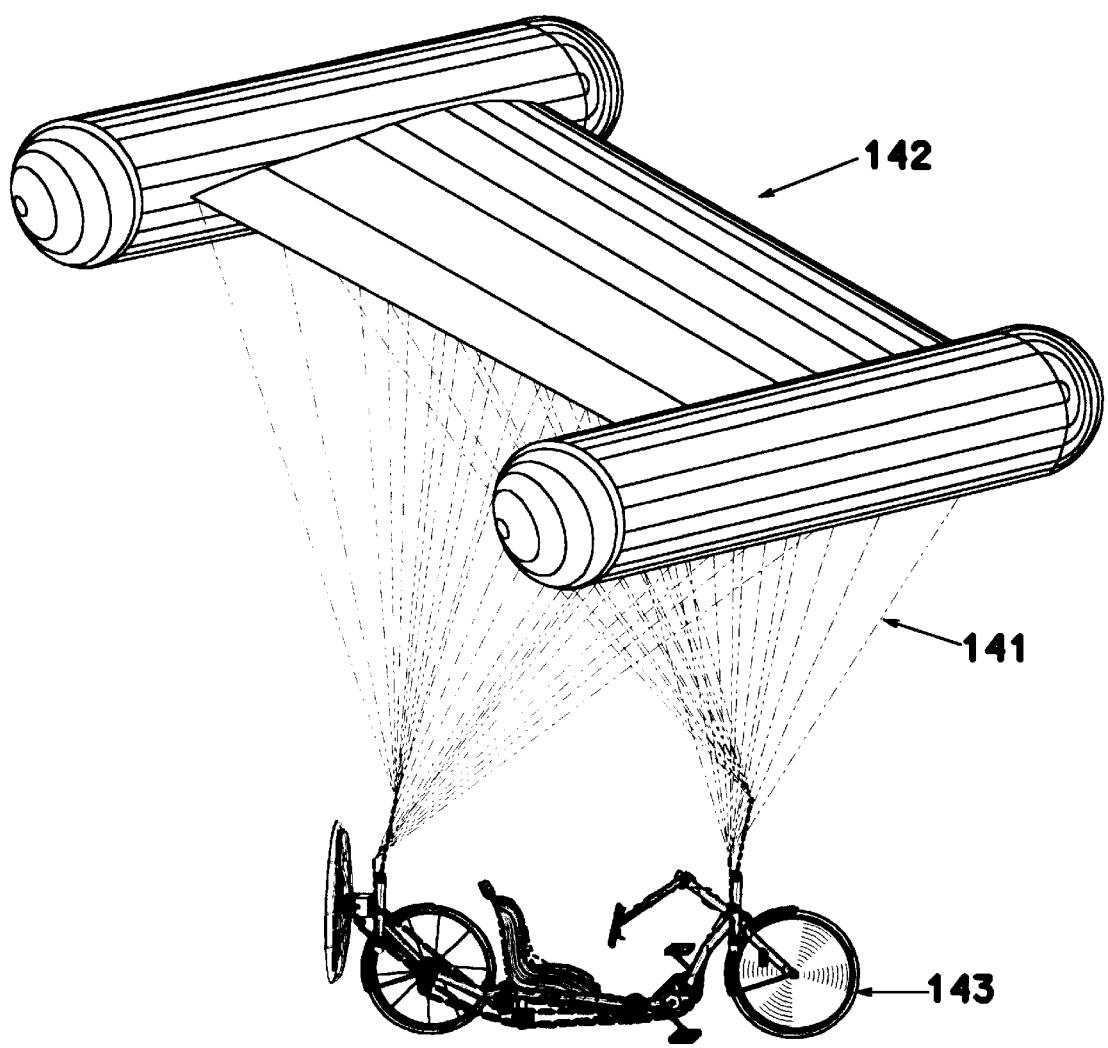
Figure 26A:
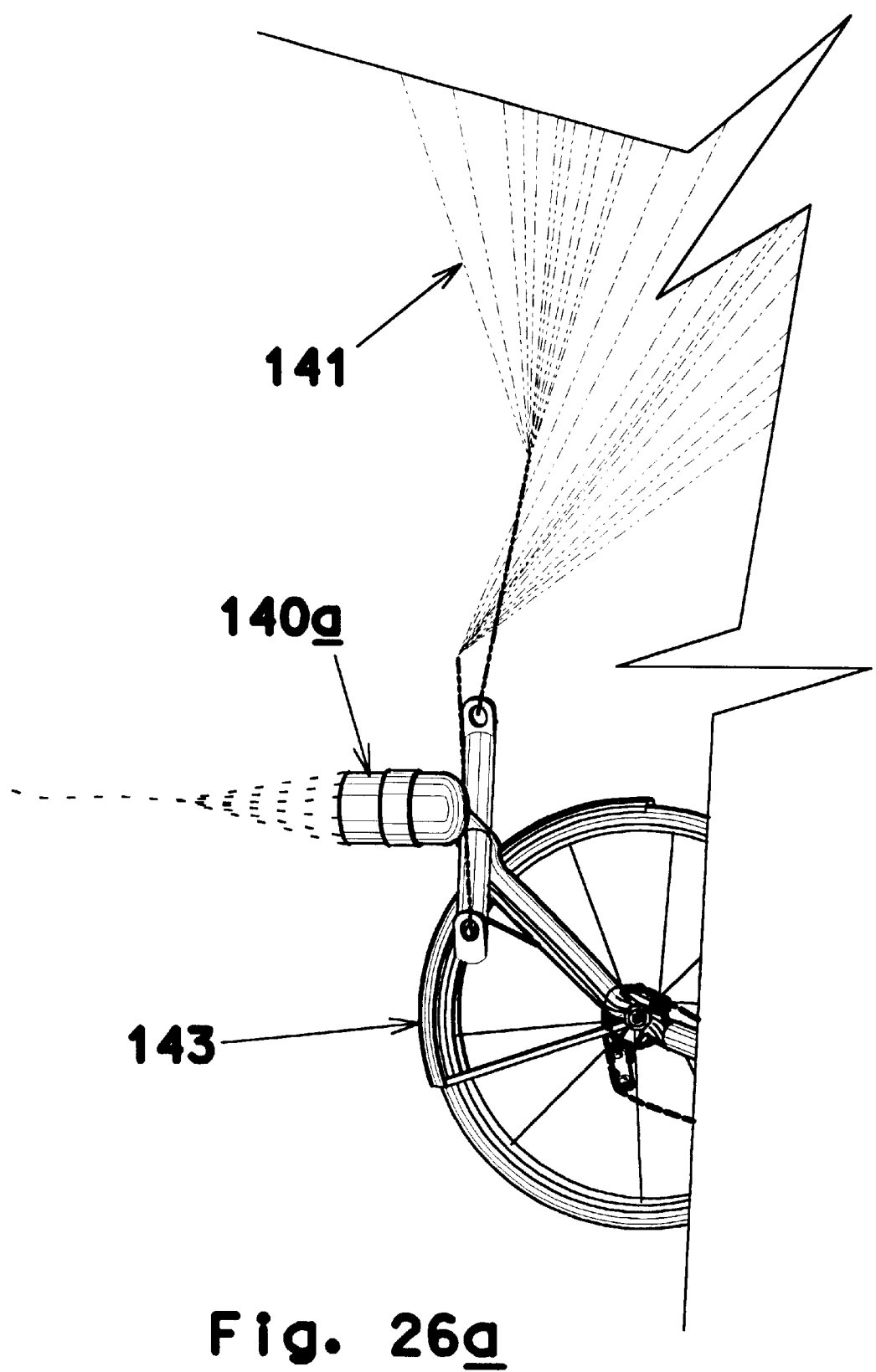
Figure 27:
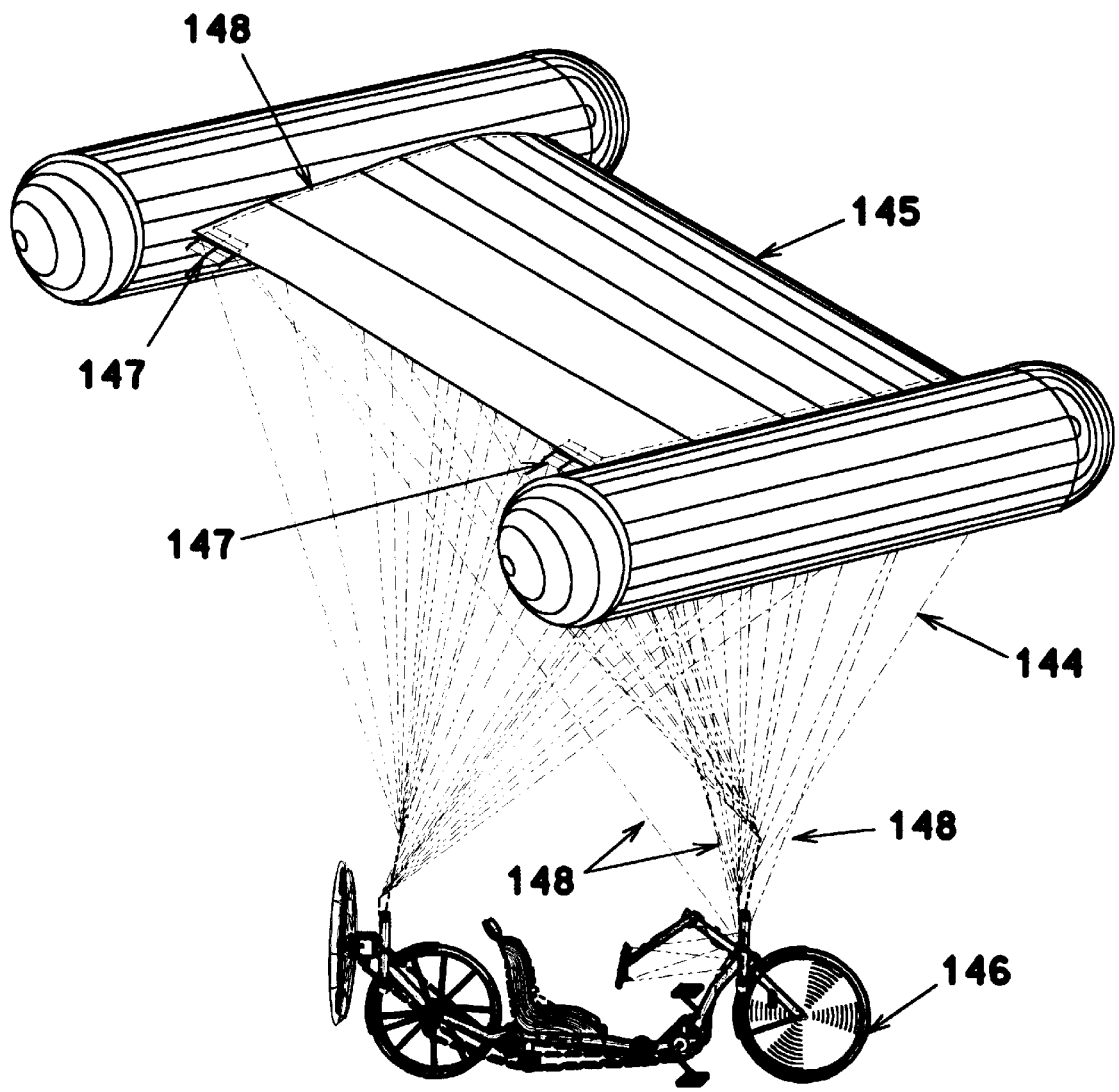
Figure 28:
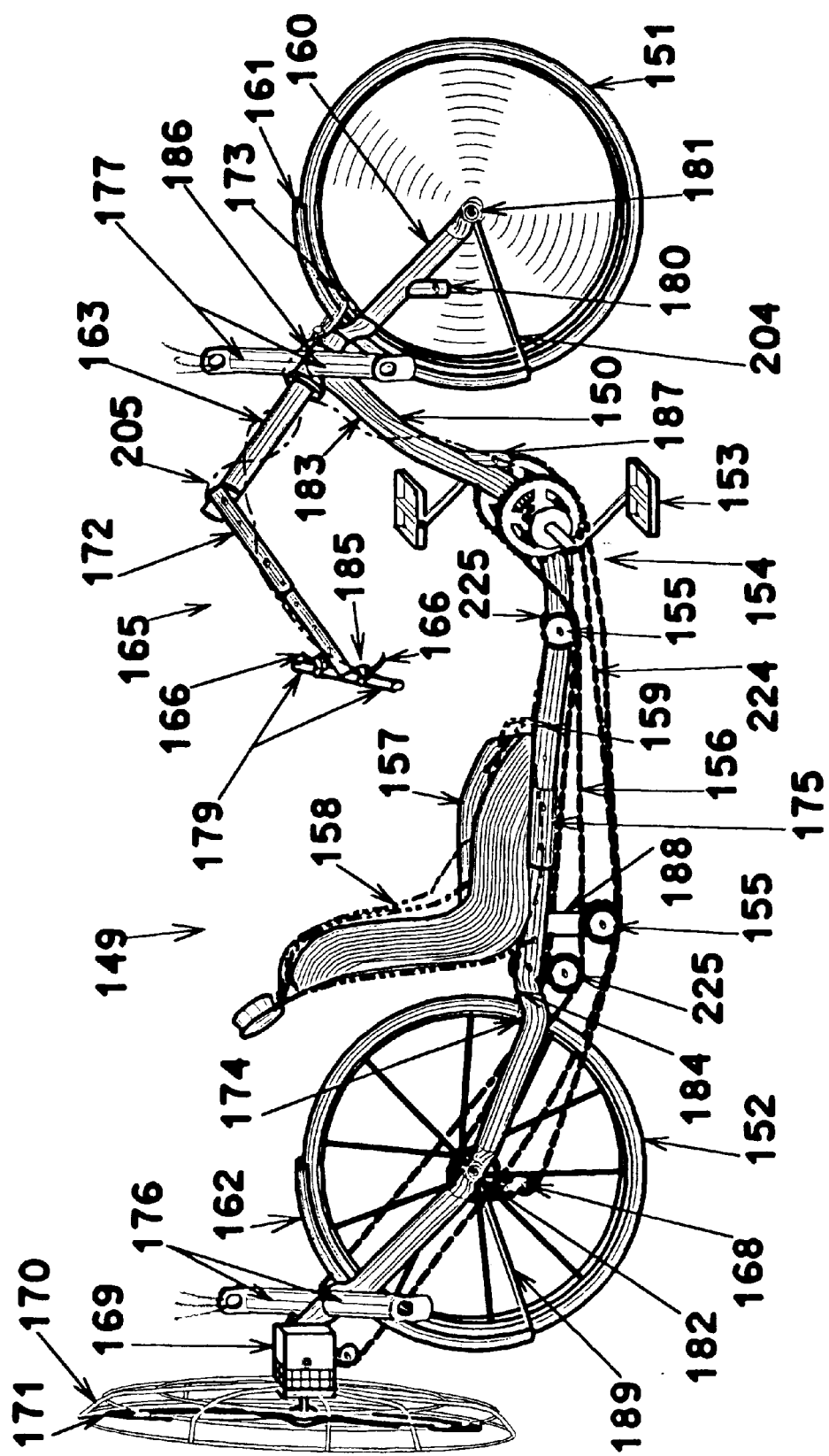
Figure 29:
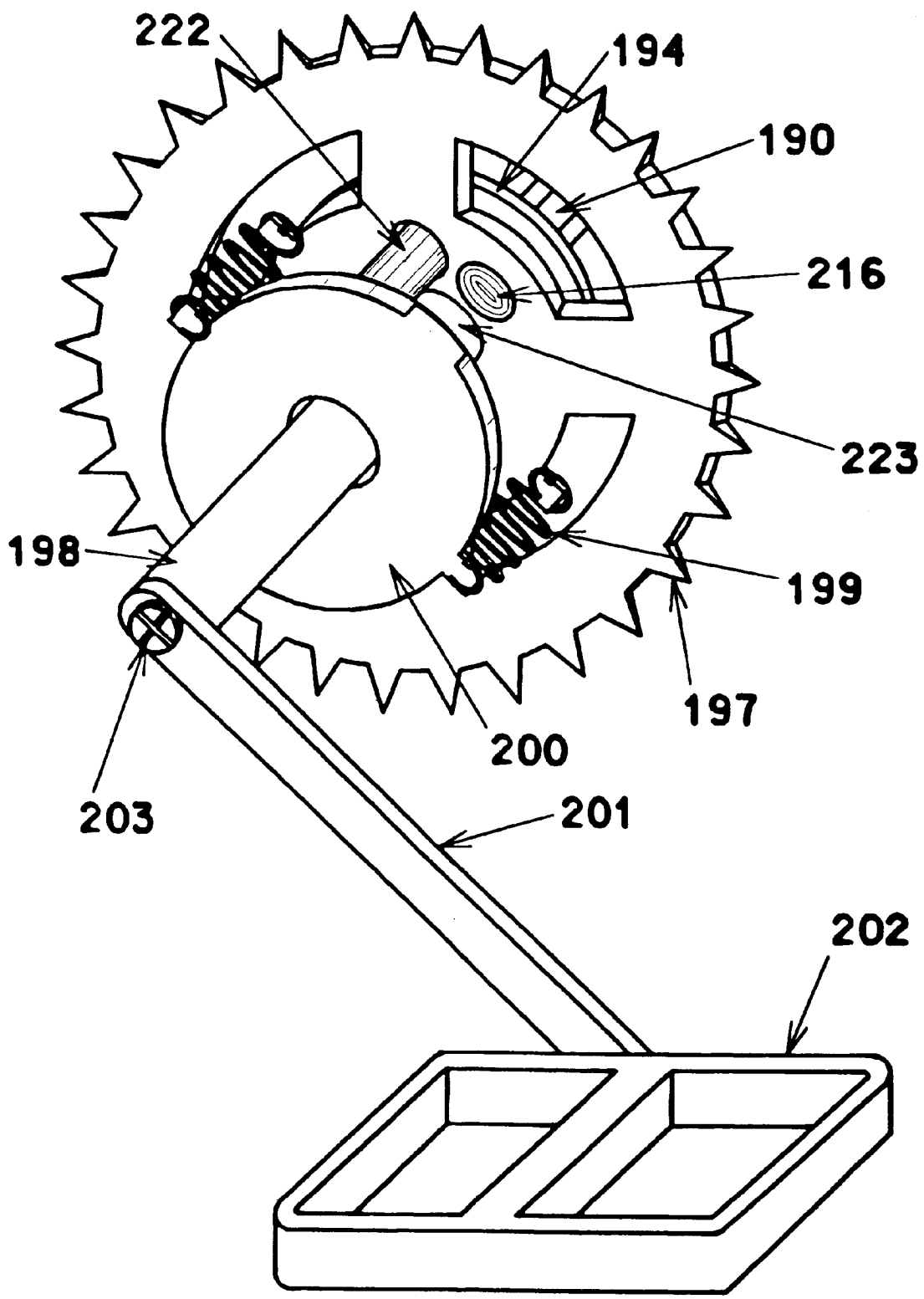
Figure 30:
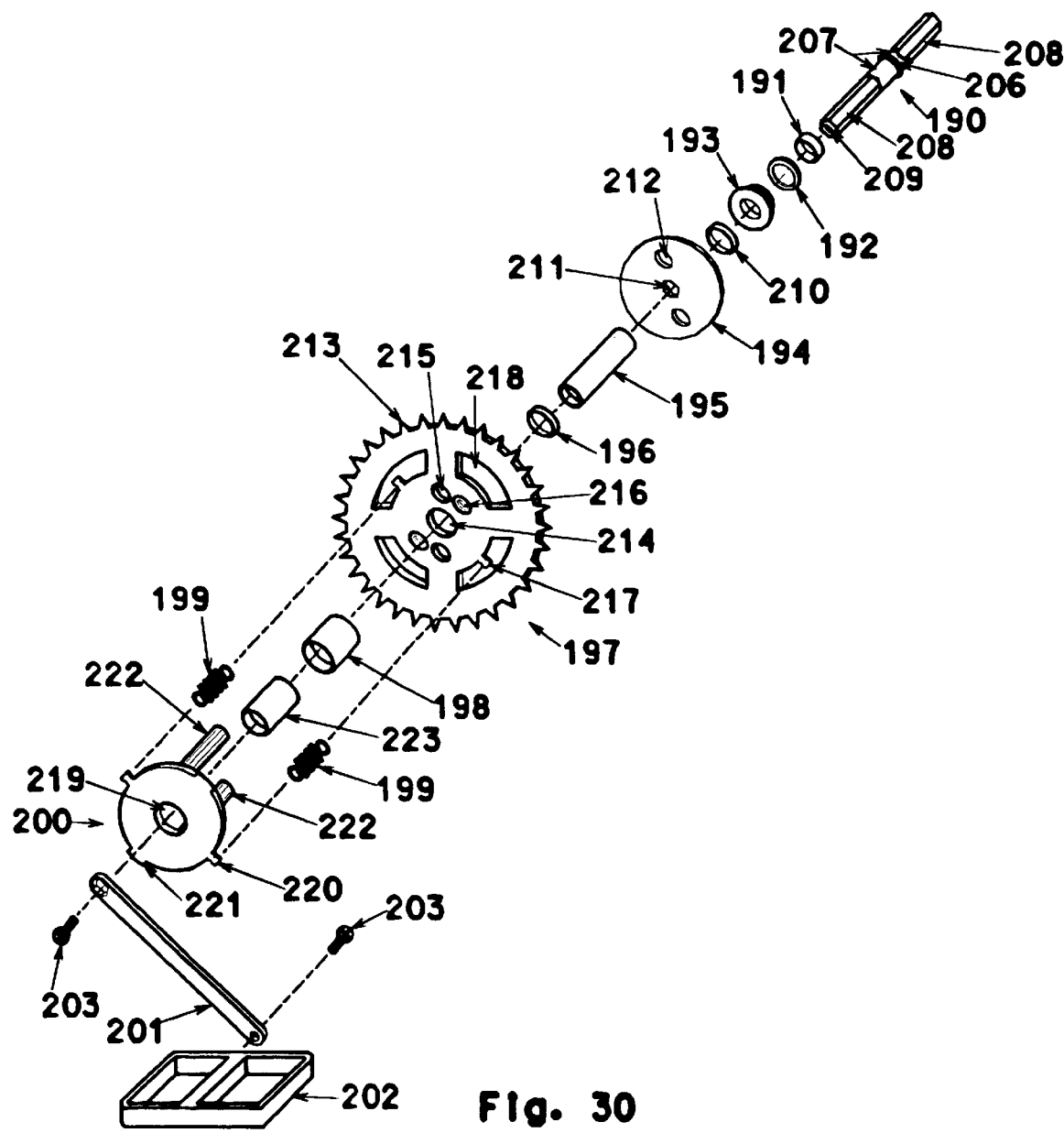
Figure 31:
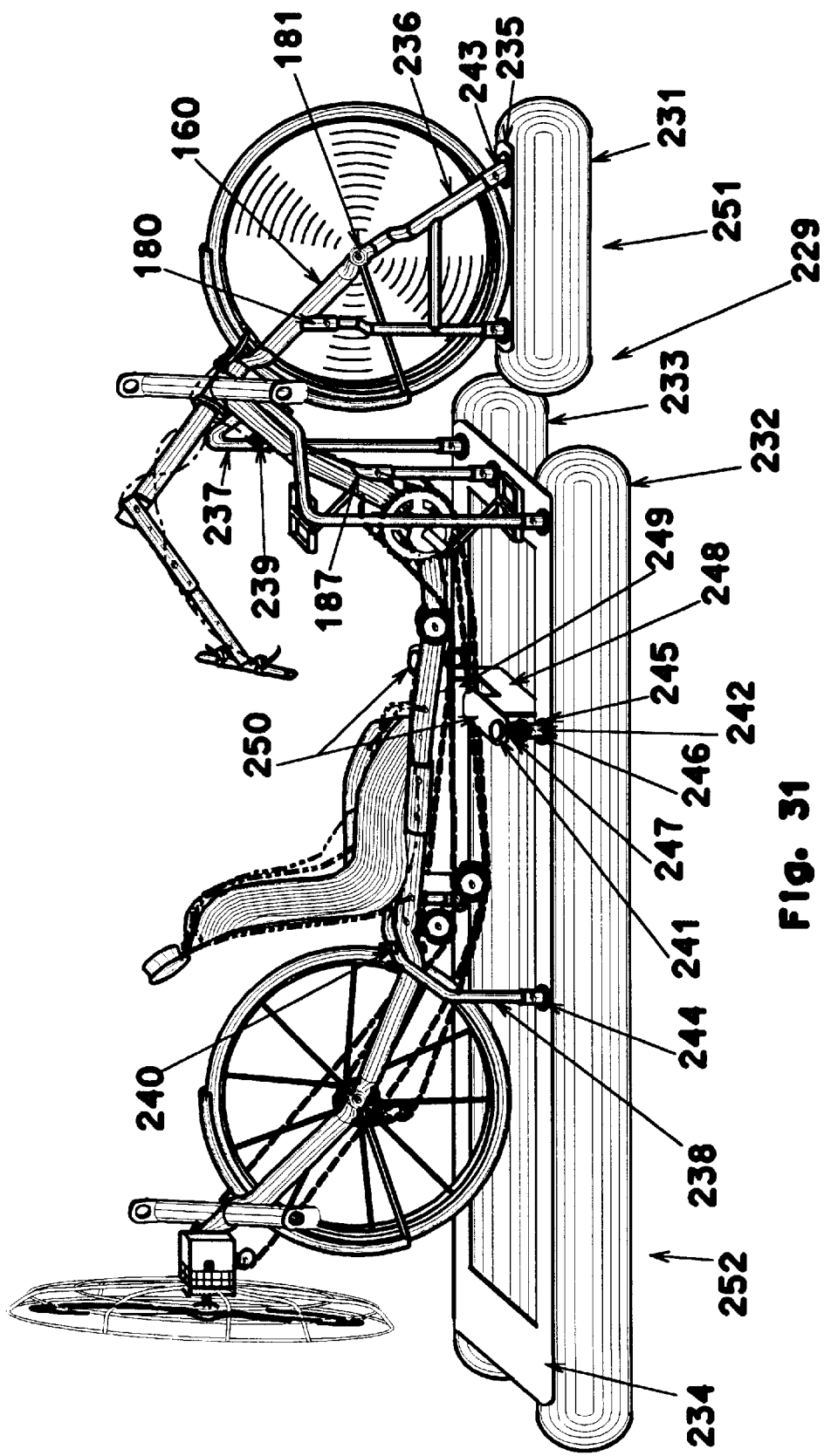
Figure 32:
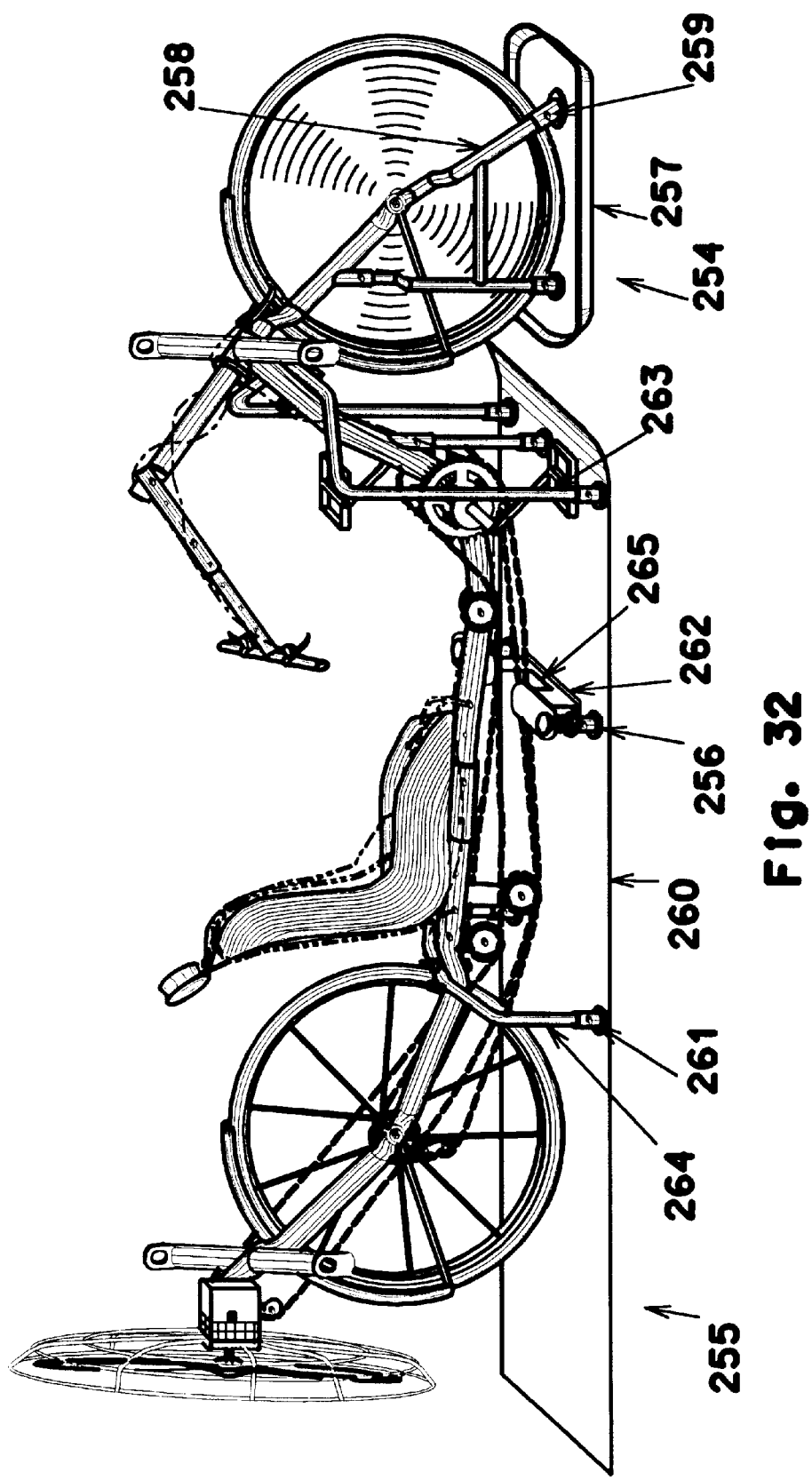
Figure 33:
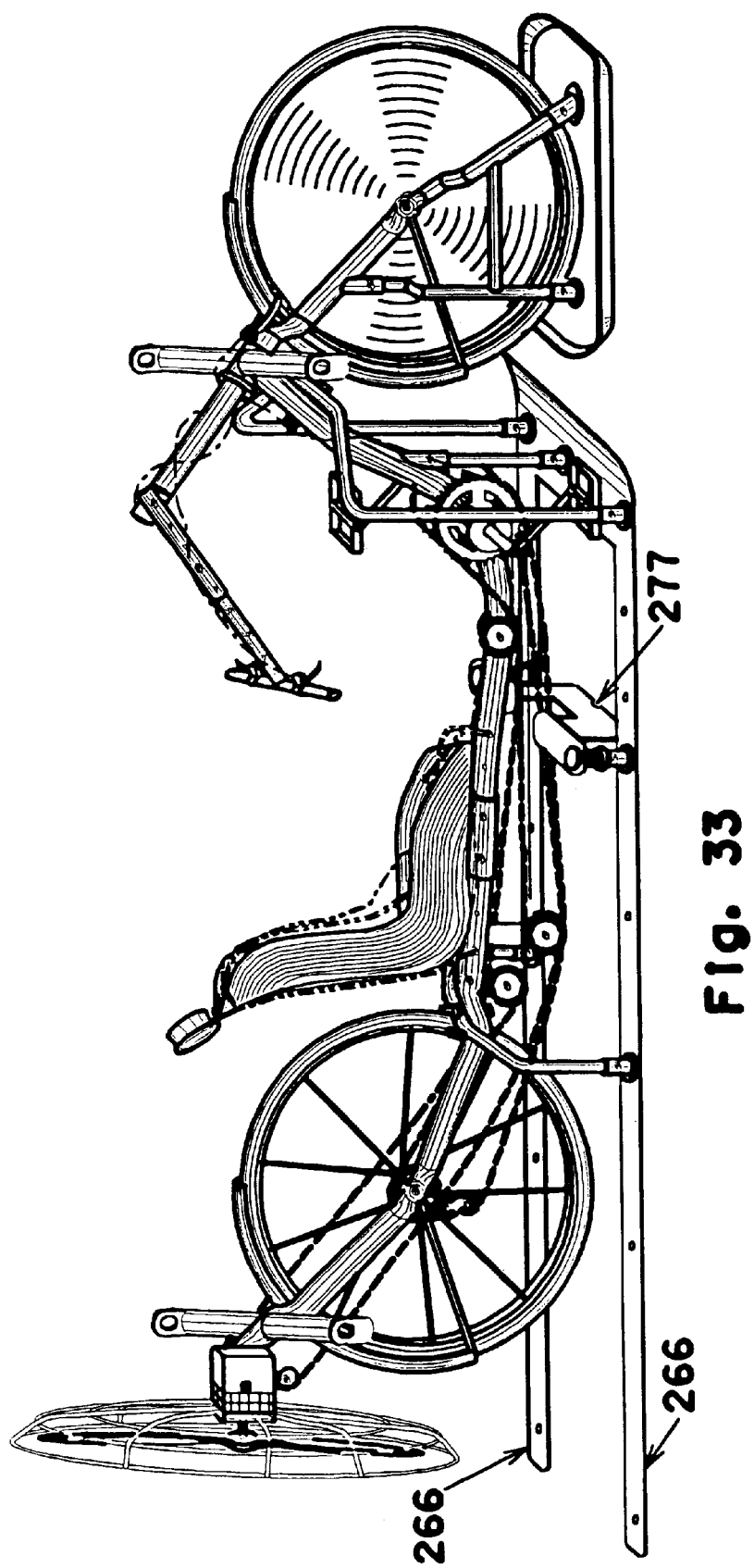
Figure 34:
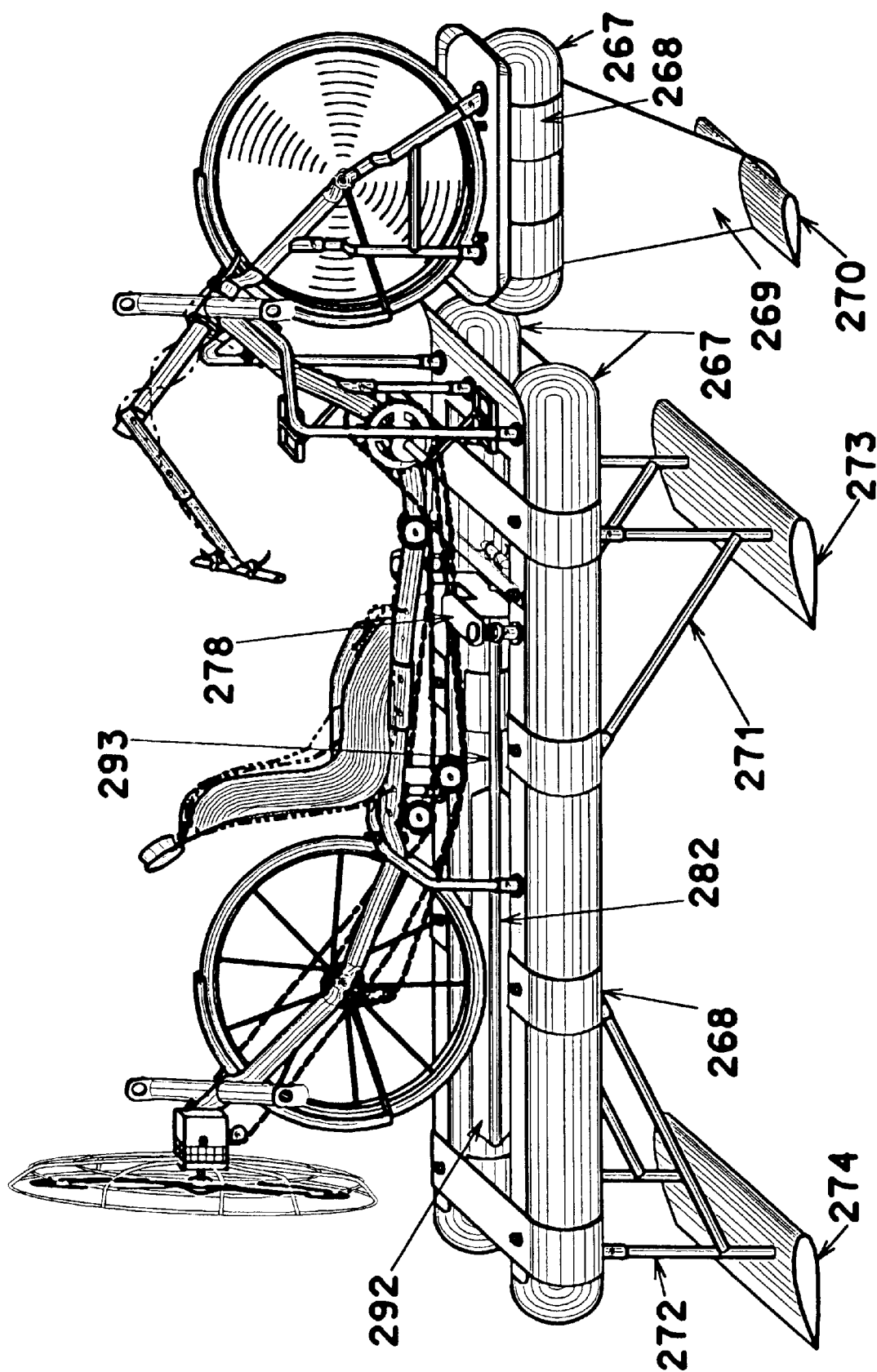
Figure 35:
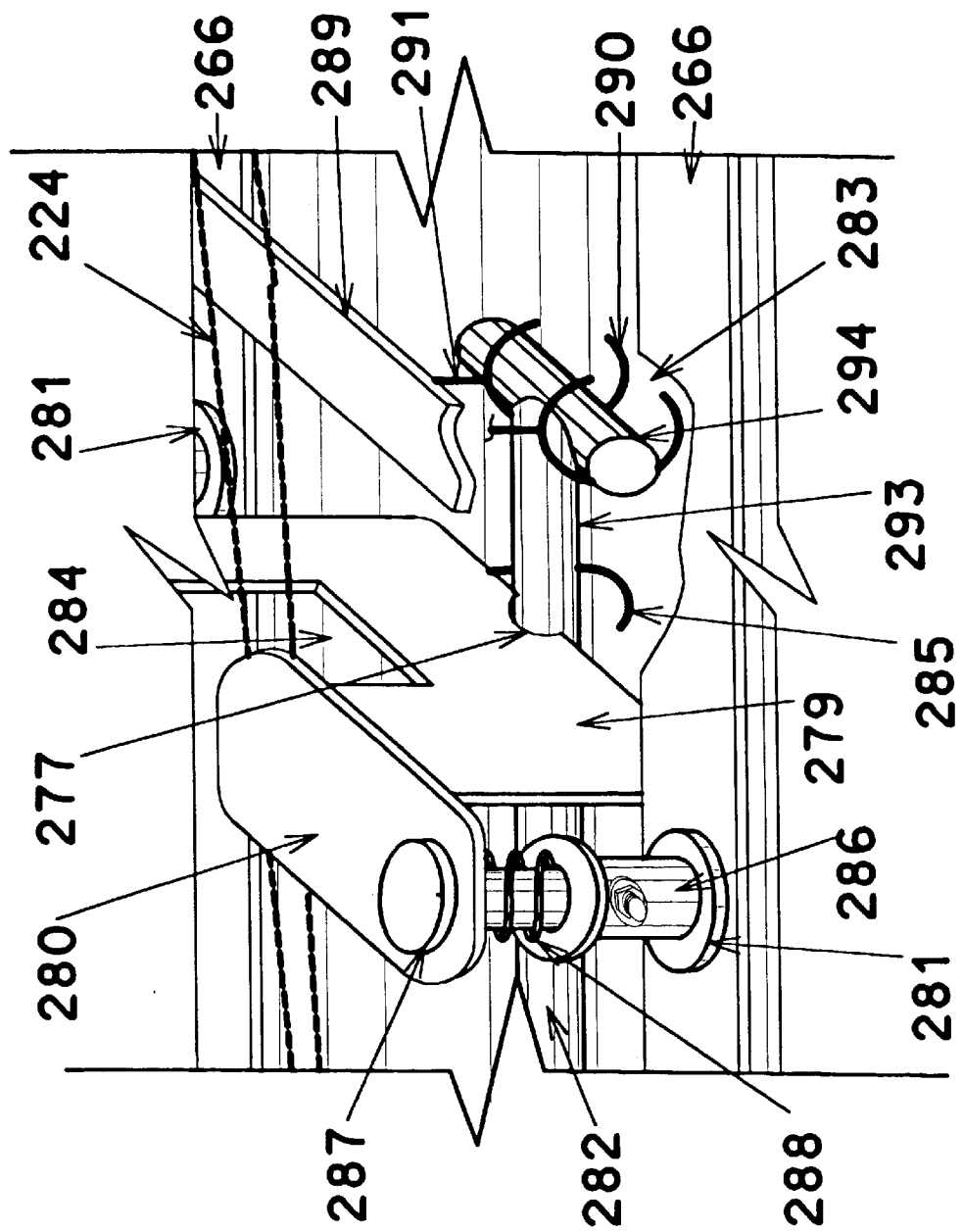
Figure 36:
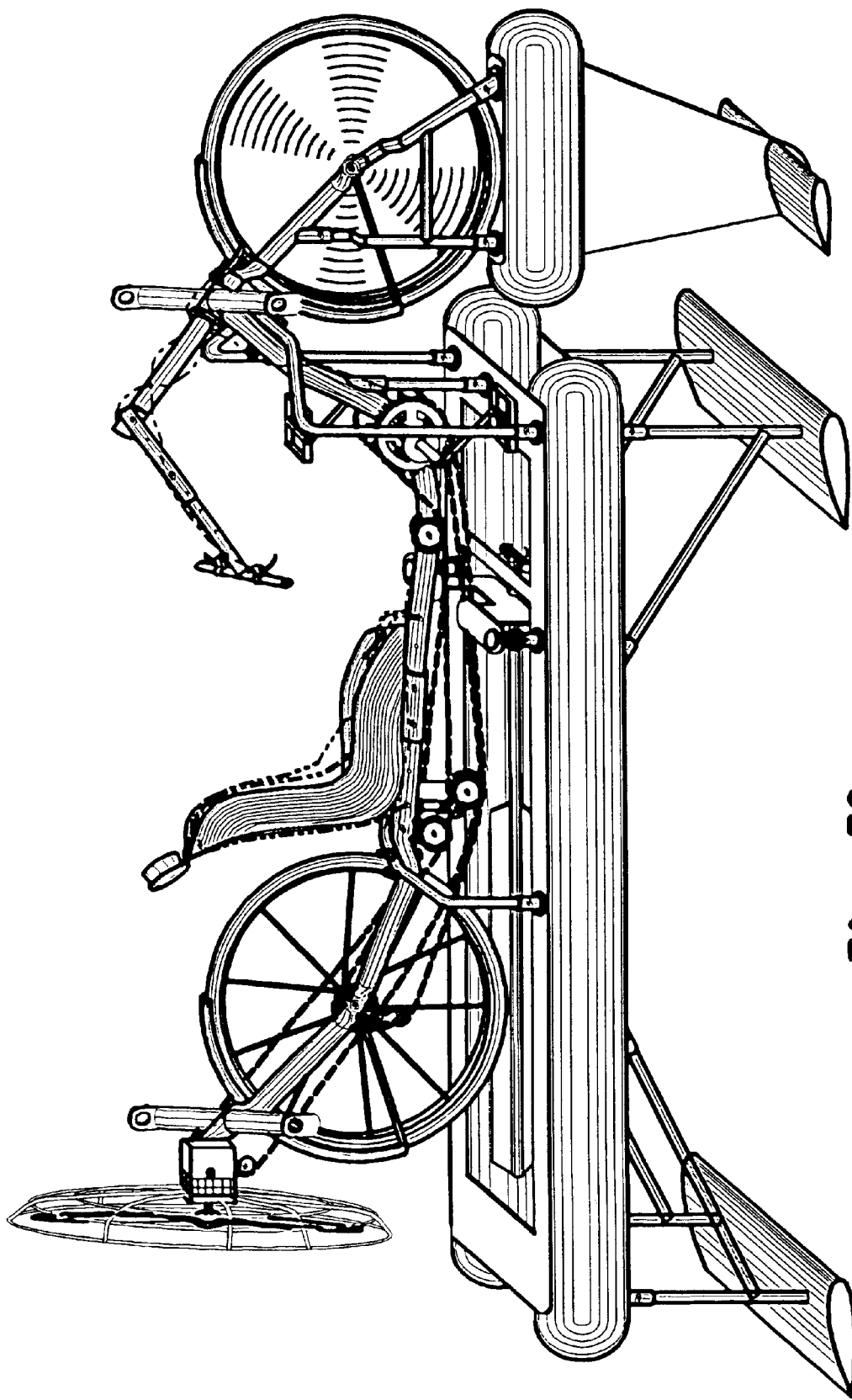

FIGS. 3 and 4 are sectional views taken on lines 3—3 and 4—4 shown in FIG. 2;

FIG. 5 is an isometric view of another variation of the invented inflatable airfoil;

FIG. 6 is a variation of a sectional view taken on lines 6—6 shown in FIG. 5;

FIG. 7 is a sectional view taken on lines 7—7 shown in FIG. 6;

FIGS. 8, 9, 10, 11, 12, 13, 14 and 15 are isometric views of other forms or variations of the invented inflatable airfoil and associated structure;

FIG. 16 is an enlarged sectional view taken on lines 16—16 shown in FIG. 11;

FIG. 17 is a section variation taken on lines 17—17 of FIGS. 13, 14 and 22;

FIG. 18 is another variation like the sectional view shown in FIG. 17;

FIG. 19 is another variation of the sectional view shown in FIG. 16;

FIG. 20 is another variation of the sectional view shown in FIG. 2;

FIG. 21 is a sectional view taken on lines 21—21 shown in FIGS. 19 and 20;

FIG. 22 is an end view of the apparatus shown in FIG. 15;

FIG. 23 is a partial isometric view of a control surface which can be used as a rudder, elevator or aileron, with respect to the airfoil as in FIG. 1;

FIG. 24 is an isometric view which shows apparatus as disclosed and used as a glider;

FIG. 25 is an isometric view which shows apparatus as disclosed, used as a powered glider;

FIG. 26 is an isometric view which shows apparatus as disclosed and used with a propeller driven vehicle, the device operable as an ultralight aircraft;

FIG. 26a is a fragmentary view showing jet propulsion;

FIG. 27 is an isometric view which shows apparatus as disclosed, and used with a propeller driven vehicle, the device operable as an ultralight aircraft, with ailerons;

FIG. 28 is an isometric view of a propeller driven human powered bicycle, to be elevated using an airfoil or airfoils as disclosed;

FIG. 29 is an isometric view of a pedaling system for the propeller driven human powered bicycle of FIG. 28; the right side pedaling system of the bicycle is shown, the left side pedaling system being a mirror image of the right side pedaling system;

FIG. 30 is an isometric exploded view of the pedaling system shown in FIG. 29;

FIG. 31 is an isometric view which shows the FIG. 28 type apparatus on floats;

FIG. 32 is an isometric view which shows the FIG. 28 type apparatus on a sled system;

FIG. 33 is an isometric view which shows the FIG. 28 type apparatus on a skid system;

FIG. 34 is an isometric view which shows the FIG. 28 type apparatus on floats with hydrofoils;

FIG. 35 is a partially broken, isometric view which shows details of a brake used with an oar system for the apparatus as shown in FIG. 34;

FIG. 36 is an isometric view which shows the FIG. 28 apparatus on floats with hydrofoils; and FIG. 37 shows airfoil tubes 54 and 54a in lengthwise sections separated by panels, whereby accidental deflection of any one section will not substantially reduce stabilized buoyancy provided by the entire airfoil.

DETAILED DESCRIPTION

The basic aeronautical apparatus, as shown in the drawings, comprises
 a) a primary airfoil, having at least one panel which is
  i) an upper panel
  ii) a lower panel
 b) multiple inflated tubes protectively associated with the airfoil and extending lengthwise thereof,
 c) said tubes including
  i) relatively larger cross-section tubes positioned chordwise of the airfoil,
  ii) relatively smaller cross-section tubes positioned to stabilize said relatively larger diameter tubes.

Referring to FIGS. 1, 2, 3 and 4, an example comprises an inflatable airfoil 10 having an airfoil segment 51 extending between two like end tubes or structures 52, and having many optional suspension lines or tethers 53, which can be flexible or substantially inflexible. Each end tube 52 is made of an airtight flexible membrane or membrane panels. A fabric or net 52a is optionally wrapped around the end tube to enhance its strength. The end tube may have various diameters along its length, although constant diameter end tubes are shown in the drawings.

The airfoil segment 51 typically consists of many segment tubes 54 contained between upper and lower membrane panels 56 and 56a, configured as an airfoil. See also the segment tension tail 55. Each segment tube is also made of an airtight flexible membrane such as plastic material. A fabric or net may be optionally wrapped around the tube to enforce its strength. The segment tubes have various cross-sections or diameters as shown, and include larger tubes 54 and smaller tubes 54a acting as stabilizers. Four tubes 54a preferably stabilize certain larger tubes 54. The segment tubes are preferably connected to each other along their lengths, as by bonding.

The segment tubes may be cylindrical and so arranged that they form truss-like supports relative to each other. The airfoil segment 51 which the segment tubes internally support therefore is stabilized. The segment tension tail 55 maybe a tube, a rope or string with opposite ends connected to the end tubes 52. The airfoil segment skin is a fabric or membrane as for example plastic, which wraps around and connects with the inter-connected segment tubes and the segment tension tail 55. The segment skin also connects with the end tubes 52. The compressive forces of the ends (57, FIG. 3) of the inflated segment tubes 54 and 54a against the sides of the inflated end tubes 52, and the internal pressure of the end tubes, will keep the selected length segment tension tail 55 held close to a straight line. When the tubes 54 and 54a are wrapped by the segment skin, and when the tubes are inflated, the tension of the segment tension tail (which is end-connected to tubes 52) will force the segment skin rearwardly away from the last segment tube (58 FIG. 2) in the sequence. Since the segment tension tail 55 is so small in size, it can form a relatively sharp-edged trailing edge for the airfoil. Spaces within the airfoil but outside the tubes may also be inflated. The diameters of the segment tubes and their connections will be so selected that when the end tubes and the segment tubes are inflated, they together with the segment tension tail and the segment skins 56 and 56a will form an airfoil as shown. Suspension lines or tethers 53 are provided and may comprise a string or strings or a rope which is or are end-connected with the segment skin. The connection points of the suspension lines to the segment skin will be spaced apart at the bottom side of the airfoil segment. The lower ends of the suspension lines will either be joined together or will connect with traveling structure to be described later. Representative inflation devices for the tubes appear at 400, in FIG. 2.

Referring to FIGS. 5, 6 and 7, another variation comprises an airfoil segment 60, as described above, two end tubes 61 and many optional suspension lines 62. This variation of the invented inflatable airfoil is similar to the first variation. The principle difference being that the opposite ends 61a of the cylindrical end tubes 62 have cone shape. Tubes 62 are inflatable, and support the ends of the tubes in the airfoil.

Figure 8:
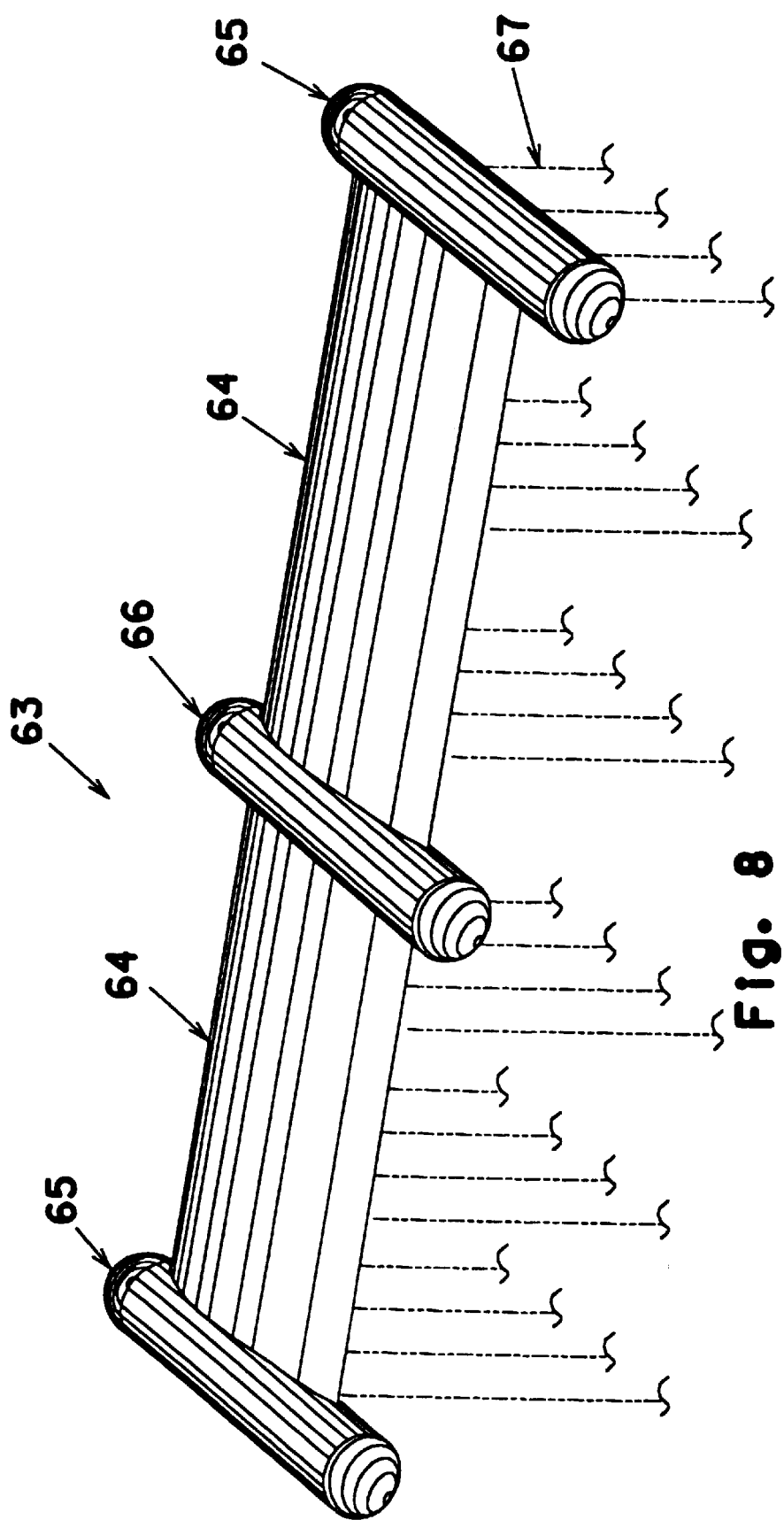

Referring to FIG. 8, the inflatable airfoil 63 includes two laterally extending airfoil segments 64, two longitudinally extending end tubes 65, a middle tube 66 extending longitudinally, and many optional suspension lines 67 connected to 63, 65 and 66. The airfoil segments, the end tubes and the suspension lines are identical to those of the first variation of the inflatable airfoil. The middle tube has a construction like that of the end tubes. The middle tube can be considered as a shared end tube among two adjacent inflatable airfoils 64. Based on this description, although it is not shown in the drawings, an inflatable airfoil can consist of "n" (a number) of airfoil segments, two end tubes, "n–1" intermediate tubes, and many suspension lines.

Figure 9:
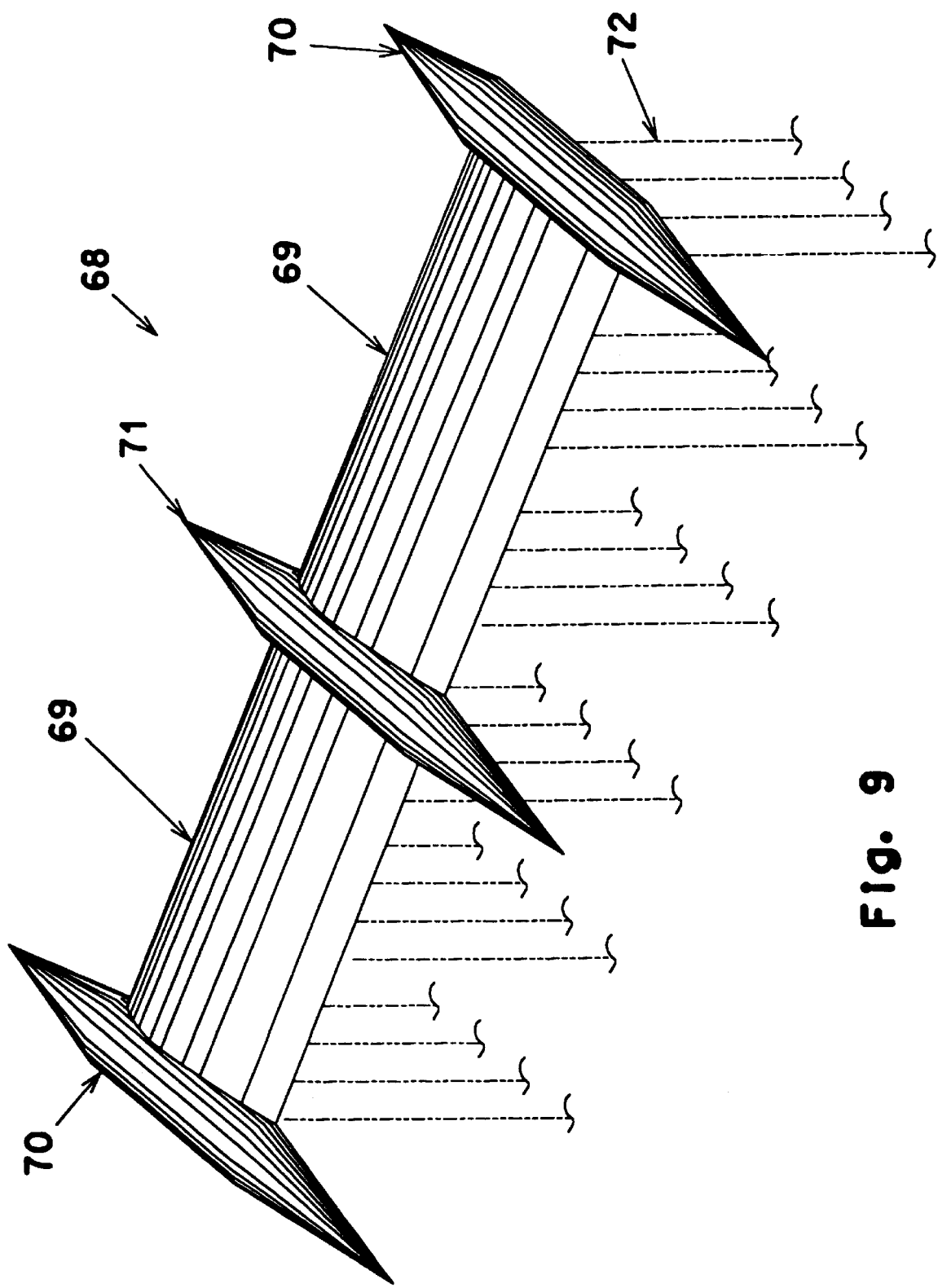

Referring to FIG. 9, the inflatable airfoil 68 comprises two airfoil segments 69, two end tubes 70, a middle tube 71 and many optional suspension lines 72. This variation is almost identical to the variation shown in FIG. 8, the principle difference between these two variations being that the forward and rearward ends of the end tubes and of the middle tube(s) of the FIG. 9 variation have cone shape.

Figure 10:
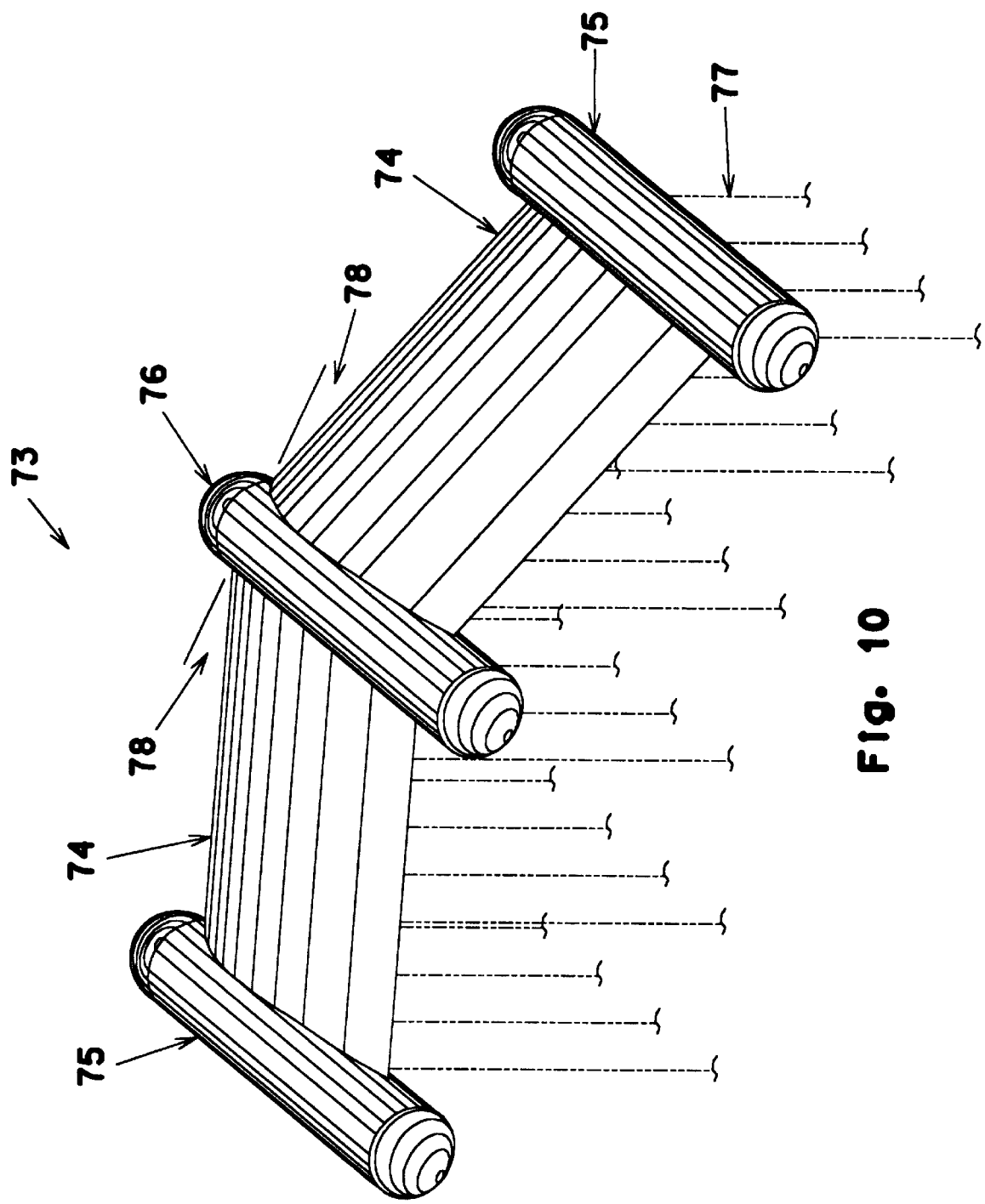

Referring to FIG. 10, the inflatable airfoil 73 comprises two airfoil segments 74, two end tubes 75, a middle tube 76 and many optional suspension lines 77. This variation is almost identical to the variation shown in FIG. 8 except that airfoil section endwise sweep 78 exists for the FIG. 10 variation. The ends of the end tubes and the middle tube(s) may be cone-shaped, as in FIG. 9.

Referring to FIGS. 11 and 16, the inflatable airfoil 79 comprises an airfoil segment 80 as in FIGS. 1–3, two end tubes 81, a laterally extending tail plate 82, and many optional suspension lines 83. The airfoil segment and the suspension lines are like those described earlier. The longitudinal end tubes 81 for this variation are longer than those previously described, to accommodate tail plate 82 which is a membrane having opposite ends connected to elongated portions of the end tubes 81. The tail plate may serve as a stabilizer for the inflatable airfoil 80.

Figure 12:
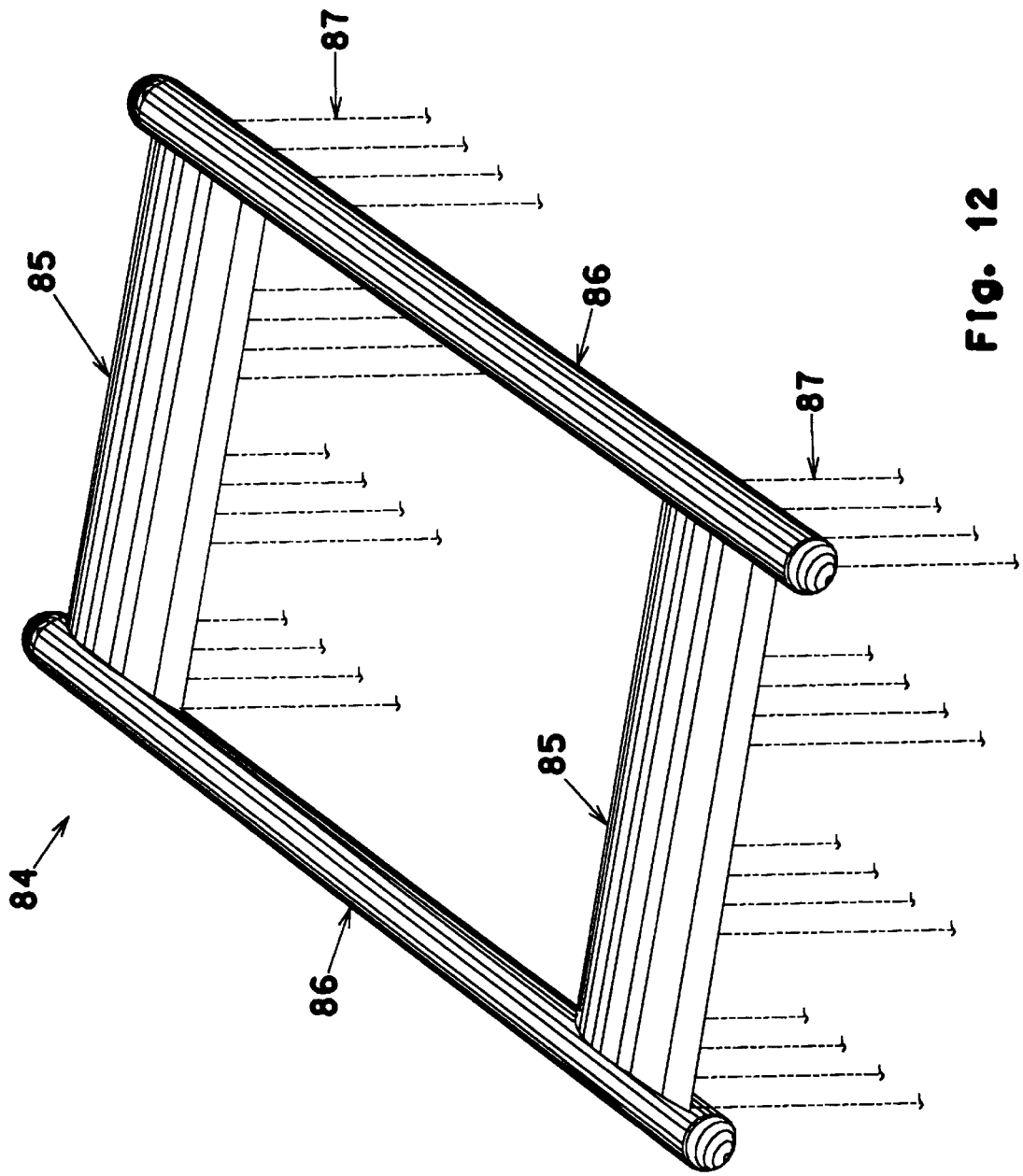

Referring to FIG. 12, the inflatable airfoil 84 comprises two like laterally extending airfoil segments 85, as in FIGS. 1–3, two longitudinally elongated end tubes 86, and many optional suspension lines 87. The airfoil segments and the suspension lines are identical to those described earlier. The end tubes are elongated. At each end the two airfoil segments connect with each end tube near an end thereof.

Referring to FIGS. 13 and 17, the inflatable airfoil 88 comprises two airfoil segments 89, two end tubes 90, an elongated middle tube 91, several stabilizer tail plates 92, and multiple optional suspension lines 93. The airfoil segments, the end tubes and the suspension lines are identical to those described earlier. The middle tube has a construction similar to that of the end tube, except that the middle tube is elongated. The tail plates are mounted near the rearwardmost end of the middle tube. Each of the tail plates 92 consists of many inflated tubes 94 joined longitudinally at locations 94a and wrapped by a membrane 95. The tail plates may serve as stabilizers or fins for the inflatable airfoil 88. The middle tube 91 can be considered as the shared end tube between two adjacent inflatable airfoils of the first variation. Based on this description, although it is not shown in the drawings, an inflatable airfoil can consist of "n" (a number) airfoil segments, two end tubes, "n–1" middle tubes, many tail plates and many suspension lines.

Referring to FIG. 14, the inflatable airfoil 96 comprises two airfoil segments 97, two end tubes 98, and elongated middle tube 99, multiple tail plates 100, and many optional suspension lines 101. This variation is almost identical to the variation shown in FIG. 13, the principle difference being that the ends of the end tubes and the middle tube (s) of the FIG. 14 variation have cone shape.

Referring to FIGS. 15 and 22, the inflatable airfoil 102 comprises two airfoil segments 103, two end tubes 104, a middle tube 105, multiple tail plates 106, bracing lines 107, and many optional suspension lines 108. The airfoil segments, the end tubes and the suspension lines are identical to those described earlier. The middle tube 105 has construction similar to that of the end tube 104 except that the middle tube is enlarged and elongated. The tail plate or plates 106 are mounted near the rearward end of the middle tube 105. The tail plates are the same as those shown in FIG. 17. The bracing lines 107 with ends are connected with each of the airfoil segments . The bottom portion of the middle tube 105 retains the laterally extending bracing lines 107, so that the bracing lines and the middle tube together provide bracing to the two swept airfoil segments. The bottom of the middle tube may be reinforced with additional thickness of membrane. The bracing lines 107 are spaced apart away from tube 105 so that they can exert substantially the same forces on the airfoil segments. The connections of the bracing lines with the airfoil segments are similar to those of the suspension lines described for the aforementioned inflatable airfoils. The upper ends of the suspension lines 108 may connect with the middle tube, or the undersides of the airfoil segments, or both. This variation may have airfoils with back or forward sweeps at 109 and dihedrals 100. This variation may also optionally have cones at the ends of the end tubes or the middle tube.

Referring to FIG. 18, an alternative tail plate 111 consists of spaced-apart inflated tubes 112 connected by membranes 113. This alternative tail plate may replace those described in FIGS. 13, 14 and 15.

The invented devices shown in FIGS. 8, 9, 10, 13, 14 and 15 may optionally have dihedrals as in FIG. 22, although none of them are shown. Also, the tail plates described in FIGS. 13, 14 and 15 may become canards if located in front of the leading edges of the airfoil segments, i.e. these are equivalents.

Although not shown, in lieu of being inflatable tubes, the end tubes and/or the middle tubes of all of the inflatable airfoils may be of rigid structure form or forms. For an example, an airfoil segment may be enclosed by two rigid shells which may form a cylinder when the airfoil segment is not inflated. When the airfoil segment is inflated, the ends of its segment tubes will push apart the two shells. The segment tail by which each end is mounted onto each shell will be pushed tightly straight. This will form the combined airfoil segment and the end shells as an airfoil. As another example, a deflated airfoil can be enclosed inside an automobile body the side panels of which could be used as the end tubes of the inflatable airfoil. The automobile may have engines and propulsion propellers. When the inflatable airfoil is inflated, the automobile becomes the middle tube of the invented inflatable airfoil. The bracing lines may extend from one airfoil segment through or underneath the automobile body to the other airfoil segment, in the manner shown in FIG. 15. This would connect the automobile to airplane. The optional suspension lines for this example will not be needed. Inflation gas or gases for the described tubes may include helium, air, hydrogen, or other gases. The sizes of the airfoil and end tubes are chosen to develop lift needed to elevate the load at propulsion speed.

Referring to FIGS. 19, 20 and 21 they show sectional views of a variation of the airfoil segments described previously. This airfoil segment consists of several larger segment tubes 115, several smaller stabilizing segment tubes 115a, and a segment upper skin or panel 116. The tubes 115 and 119 arc downwardly opening exposed. A segment tube is made of airtight flexible membrane. A fabric or net may be optionally wrapped around the tube to enforce its strength. The segment tubes have various diameters. The segment tubes are longitudinally connected along their lateral lengths, to each other, as at locations 115b and 115c, and as by bonding. The ends of the segment tubes connect with the end tubes 117, as by bonding. The segment skin is a fabric or membrane (for example plastic film) whose frontal portion is laid and mounted on tops of the segment tubes. The lateral edges of the segment skin 120 are connected to the end tubes 117. The lateral edges of the tail portion 118 of the segment skin are connected to the end tubes 117 tangentially from the nearest segment tube 119. Together with the bundle of the segment tubes and the forcing of the ends of the inflated segment tubes against the inflated end tubes, the segment skin 120 will be under proper tension and will form an airfoil like segment. The suspension lines 121 connect to the segment tubes and the concave under portion of the segment skin.

Referring to FIG. 23, an inflatable airfoil segment 123 has a control surface 122 which can be used as an aileron, an elevator or a rudder for the inflatable airfoil. The control surface consists of several inflatable tubes 125, membranes 126, control line holding projections or rings 127, control lines 128, and control line passing projections or rings 129. The inflatable tubes are made of airtight membranes and are inflatable. An inflatable tube when inflated has a "U"-shaped or "E"-shaped footprint or outline, as shown. The membrane 126 wraps across the inflatable tubes and forms the surfaces between legs of the inflatable tubes. The membrane also extends from the inflatable tubes and joins the control surface 122 to the airfoil segment 123. The joining surface is shown as 130 on FIG. 23. A control line holding ring is a tab or projection with a hole on it. The control line holding ring is mounted near the ends of the inflatable tubes. A control line passing ring is also a tab or projection with a hole. The control line passing ring is mounted on the surface of the airfoil segment. The control line is a string or a rope. One end of each control line is connected with a control line holding ring. The other end of the control line is either joined with another control line or joined with some operable device which will be described later. The control lines pass through the holes of the control line passing rings.

In using the control surface, the control line on one side, say, the top side, of the control surface is pulled, while the control line on the other side, say, the bottom side, of the control surface will be released. This action will cause the control line holding rings on the top side to be pulled closer to the control line passing rings on the top side. This in turn tilts the control surface upwards. The control line passing rings not only confine the control lines but also guide the movements of the control lines.

The invented inflatable airfoils described herein can be inflated with gases which are lighter than air. The buoyancy of the inflatable airfoil can be thus controlled. Depending on the types or mixtures of gases used to fill the segment tubes, the end tubes, and/or the middle tubes, etc. the vertical tilting angle of the inflatable airfoil can also be adjusted.

Referring to FIG. 24 and as described previously, one end of each of the optional suspension lines 132 connect with the inflatable airfoil 133 while their other ends connect with a harness 134 for a user 135. The inflatable airfoil then can be used as a glider.

In lieu of the optional suspension lines, the bottom surface of the inflatable airfoil may support several loops made of flexible material. These loops are used as handles. A human user can grasp the loops and use the inflatable airfoil as a glider or a parachute.

Referring to FIG. 25 and as described previously, one end of each of the optional suspension lines 136 connects with the inflatable airfoil 137, while the other end connects with a harness 138 for a user 139 who carries a power pack and a propulsion device such as a propeller 140. The inflatable airfoil then can be used as a powered glider or ultra light aircraft. The power pack can either be provided with an engine with fuel and control systems, or a motor with battery and control systems. i.e. a form of traveling load.

Referring to FIG. 26 and as described previously, one end of each of the optional suspension lines 141 connects with the inflatable airfoil 142, while the other end connects with a propeller driven human powered bicycle 143 which will be described later. The inflatable airfoil then can be used as an ultra light aircraft, propelled by the propeller after lifting from the ground, where the bicycle is pedaled for propulsion. FIG. 26a shows jet propulsion at 140a of the bicycle 143.

Referring to FIG. 27 and as described previously, one end of each of the optional suspension lines 144 connects with the inflatable airfoil 145, while the other end connects with a propeller driven human powered bicycle 146 which will be described later. Semi-rigid suspension 144 can be used, or flexible lines. A pair of control surfaces 147, corresponding to those of FIG. 23, are mounted on the inflatable airfoil at its rear edge. The control lines 148 are connected with the controlling devices which will be described later. The inflatable airfoil then can be used as an ultra light aircraft with ailerons, used for flight control.

Referring to FIG. 28, a propeller driven human powered bicycle 149 includes a main frame 150, a front wheel 151, a rear wheel 152, a pedaling system 153, a pedal power transmitting system 154, a seat 157, a harness system 158, a front wheel support 160, a front fender 161, a rear fender 162, a handle system 165, a brake system 185, a propeller 171, and a propeller protective frame 170.

The main frame 150 is generally an elongated flattened "U"-shaped rigid tube with a head tube 186 at one end, gear mounting holes (not shown) on the other end, many bends, other holes, a part holder 187, many ring anchors 188, two front connecting bars 177 to which airfoil tethers are connected, two rear connecting bars 176 to which airfoil tethers are connected, a rear wheel mounting hole 182, and a pedaling system mounting shell (not shown). The head tube is a short tube on which the two front connecting bars extending perpendicularly from two opposite surfaces. The third surface of the head tube connects with the main tube of the main frame. Each of the front connecting bars is a short bar with an eye at its far end, and many holes for installations of pulleys (not shown). The part holder is a short tube extending downwards from the bottom of the main frame tube as shown. There are holes on the part holder. The paddling system mounting shell is a short tube near the bottom of the frontal leg of the "U"-shaped main frame. This paddling system mounting shell is similar to a bottom bracket shell of an ordinary bicycle. The paddling system mounting shell has threads on its rims. The ring anchors are short plates extending from the main frame. The free end of each of the ring anchors forms hole. The rear wheel mounting hole is a hole which allows the hub of the rear wheel to be mounted onto the main frame. The two rear connecting bars extend perpendicularly from two opposite surfaces of the tube of the main frame near its end. Each of the rear connecting bar is a short bar with an eye at its far end. The gear mounting holes and the other holes are holes on the tube of the main frame for mounting gear boxes or other components. The bends are used so that the surfaces of the mounted front wheel and the rear wheel as well as the axle of the propeller can be or extend on the same plane.

The front wheel 151 and the rear wheel 153 may be bicycle wheels. The front wheel is a hollow disk wheel while the rear wheel is an ordinary spoke wheel. The seat 157 is a bucket seat with optional headset. The seat is mounted on a seat mounting shell 175 which is a clamp with many holes. Bolts penetrate these holes and their corresponding holes on the main frame. The bolts and nuts and washers lock the seat mounting shell on the main frame. This in turn locks the seat onto the main frame. The additional holes on the main frame will allow the seat mounting shell to be locked at different locations on the main frame, so that the distances between the seat and the paddling system can be adjusted. The harness system 158 is an ordinary harness system and is mounted directly onto the main frame as shown as 159. The front wheel support is a rigid tube with a front wheel mounting hole 181 on one end, a frontal part insert 180 near its middle, and bends near it's other end. Although a single tube is shown, the front wheel support could be a fork like the fork of a bicycle. The frontal part insert is a short tube extending downwards from the front wheel support. There are holes on the frontal part insert. The front wheel mounting hole is a hole or a fork in which the axle of the front wheel is mounted onto the front wheel support. The other end with bends of the front wheel support is inserted and mounted into the head tube of the main frame. The front fender and the rear fender are wheel fenders with braces. The front fender is mounted on the front wheel support. The free end of its brace is mounted on the front wheel support at it s front wheel mounting hole. The rear wheel fender is mounted onto the main frame. Its brace 189 is mounted on the rear wheel mounting hole of the main frame.

The handle system 165 consists of a front wheel control stem 163 and a telescoping handle bar 172. The front wheel control stem is a rigid tube which one end is inserted into and connected to the head tube of the main frame. The other end of the front wheel control stem has a hole. The telescoping handle bar consists of two rigid tubes telescoped each other. One end of the first tube connects with the front wheel control stem with its hole by a bolt, a washer and a nut. One end of the second tube has a handle bar 179 which is a short tube connected perpendicularly to the second tube. There is a hole at one end of the handle bar. There are many holes on the first and the second tubes of the telescoping handle bar. The two tubes are telescoped to each other and are connected together by bolts, nuts and washers.

The brake system 185 consists of two brake levers 166, two brake cables 205, cable guides (not shown), a front brake 173, a rear brake 174, and associated structures. The brake system has the same components as those of an ordinary bicycle. The propeller 171 is driven by the pedal transmitting system, which will be described later. The propeller protective frame is a cage or part of a cage which prevents foreign objects from being hit by the propeller. Another propulsion device is a small rocket.

Referring further to FIGS. 29 and 30, the pedaling system consists of an axle 190, two first sleeves 191, two bearings 192, two locking rings 193, two second sleeves 210, two driving plates 194, two third sleeves 195, two fourth sleeves 196, two chain rings 197, two fifth sleeves 198, two sixth sleeves 223, four springs 199, two chain ring lockers 200, two pedal arms 201, two pedals 202, and four bolt and washer pairs 203. The pedaling system can be viewed as composed of two parts, the right part and the left part. The right part of the pedaling system is on the right side of the main frame while the left side is on its left side. The two parts are mirror images of each other.

The axle is a short metal bar with a central divide 206, two circular cross-sectional portions 207, two hexagonal cross-sectional portions 208 and two end holes 209. The central divide is in the middle of the metal bar. Each of the circular cross-sectional portions is adjacent to the central divide. Each of the hexagonal cross-sectional portions is connected to each of the circular cross-sectional portions. Each of the end holes is at each of the end surfaces of the hexagonal cross-sectional portions. The end holes have threads.

The sleeves, (first through sixth sleeves) are short tubes with various diameters and lengths. The bearings are ball bearing packs. The locking rings are rings which have threads that can engage with the aforementioned threads of the pedaling system mounting shell. The driving plate is a circular plate with a hexagonal hole 211 in the center and two holes 212 on both sides of the central hole. The chain ring is a circular plate with chain teeth 213 along its perimeter. The chain ring has a central hole 214, two holes 215 on both sides of the central hole, two depressed areas 216 next to the two holes 215 and two spring ears 217 which on hollow portions 218 of the chain ring. The chain ring locker is a plate with a central hole 219, two spring ears, a number of extruding ears 221, and two locking rods 222. The spring ears and the extruding ears are ears extruding from the rim of the plate. The locking rods are rods which extrude perpendicularly from the surface of the plate. The locking rods are on the opposite side of the central hole. The pedal arm is a short bar with holes, a round hole and a hexagonal hole, on each end. The pedal is a traditional bicycle pedal.

Although only one plate is shown in the figures, the chain ring may comprise multiple plates of chain rings such as a 24-tooth chain ring mounted onto a 36-tooth chain ring with a spacer to keep a proper space in between.

In assembling of the pedaling system, all components are connected with the axle. The first sleeves are placed on the axle next to the central divide 206. The bearings are then placed adjacent to the first sleeves. Then the axle with the first sleeves and the bearings are placed inside the pedaling system mounting shell of the main frame and locked in place by the locking rings with threads that engage with the threads of the pedaling system mounting shell. Then, the second sleeves will be placed on the axle. The first sleeves, the bearings, the locking rings and the second sleeves will cover the circular cross-sectional portions of the axle. The driving plates will then be placed onto the axle. The hexagonal cross-sectional portions of the axle will fit and penetrate the hexagonal hole 211 of the driving plates. The third sleeves are then put onto the axle. The fourth sleeves, the chain rings, the fifth sleeves and the chain ring lockers will then be put onto the third sleeves. The third sleeves will penetrate the central holes 214 and 219 of the chain rings and the chain ring lockers, respectively. The fifth sleeves will penetrate the central holes of the chain ring lockers but will not penetrate the chain rings. The sixth sleeves are then put onto the fifth sleeves. The locking rods 222 of the chain ring lockers will penetrate the holes 215 of the chain rings. One end of each spring will connect with the spring ear 217 of the chain ring while the other end will connect with the spring ear 220 of the chain ring locker. The pedal arms then will be mounted on the axle. The hexagonal hole of a pedal arm will be mounted onto the hexagonal cross-sectional portion of the axle. A bolt and a washer which engages with the threads of the end hole 209 will keep the pedal arm mounted onto the axle. Other bolts and washers which penetrate the other holes of the pedal arms will lock the pedals on the pedal arms.

As mentioned, the central divide of the axle, the first sleeves, the bearings and the locking rings will keep the pedaling system in place with respect to the main frame. The bearings will provide a proper means for the axle and the pedals to turn about. The second sleeves will ensure proper spaces between the locking rings and the driving rings. The hexagonal cross-sectional portions of the axle and the hexagonal holes of the driving plates will provide a non-sliding condition for the driving plates when the pedals are pushed to turn. The third sleeves will keep the driving plates and the pedal arms in their proper positions. The third sleeves will also provide rounded bases (or axles) for the chain rings and the chain ring lockers. The fourth sleeves will ensure proper spaces between the driving plates and the chain rings. The fifth sleeves will fix the chain rings in places by fixing the distances between the installed pedal arms and the install chain rings. The sixth sleeves will maintain minimum spaces between the chain rings and the chain ring lockers.

When the locking rods 222 of a chain ring locker penetrate through the holes 215 of a chain ring and the holes 212 of a driving plate, the locking rods provide means to transfer pedaling torque from the driving plate to the chain ring. When a chain ring locker is pulled away from the nearby chain ring; turned or twisted on its central hole; released; and rested on the supports of its locking rods which tips are sited on the depressed areas 216 of the chain ring, the means which transmit torque from the driving plate to the chain ring is no longer exist. In this way, the chain ring will not turn even if the pedaling action is still continuing.

Corresponding to the pedaling system, the pedal power transmitting system also composes of a right part and a left part. Referring to FIG. 28, the right part of the pedal power transmitting system consists of a chain 156, many guiding rings 155, a gear system 168. The chain and the gear system improves over that of a bicycle. The gear system is enclosed inside an gear box. The gear system also has its switching controls which are not shown in the figures. The guide rings are sprockets which are mounted on holes of ring anchors of the main frame. The guide rings guide the chain so that the chain can transmit the torque from the pedaling system to the gear system then to the rear wheel.

The left part of the pedal power transmitting system consists of a chain 224, many guide rings 225, and a gear system 169. The chain is similar to this of any bicycle. The guide rings are sprockets which are mounted on holes of ring anchors of the main frame. The guide rings guide the chain so that the chain can transmit the torque from the pedaling system to the gear system then to the propeller. The gear system consists of a gear set which includes its switching or selection apparatus (not shown) and a gear box. The gear set is similar to this of any bicycle. The gear set is mounted on the gear box which changes the directions of transmitted torque (for example 90°) to turn the propeller.

In using the propeller driven human powered bicycle purely as a bicycle, a user firstly makes sure that the locking rods of the chain ring lockers penetrate and join together the chain rings and the driving plates such that the torque from the pedaling system can be transmitted onto the propeller and the rear wheel. The user then pedals the pedals. After a initial speed is reached, the propeller driven human powered bicycle will move in a stable manner, in a way just like that of an ordinary bicycle in operation. The rider then stops pedaling momentarily and meanwhile pulls the chain ring locker of the right side pedaling system away from the driving plate and the chain ring in turn and lets the locking rods rest on the depressed areas of the chain ring. Then the rider can continuously do the pedaling. At this time, only the propeller will be continuously spinning, but the rear wheel will no longer supply the driving power or propulsion. Then only the driven propeller drives the bicycle.

A user may also operate the bicycle without using the propeller. In this case, the user releases the engagements of the locking rods with the chain ring and the driving plate of the left side pedaling system. The user ensures the engagements of the locking rods with the chain ring and the driving plate of the right side pedaling system. This enables selective drive of the propeller or the bicycle wheel. The devices shown in FIG. 28 can then be operated as a bicycle.

Referring back to FIG. 26, one end of the suspension lines 141 connect with the inflatable airfoil while their other ends connect either directly with the eyes at the front connecting bars and the rear connecting bars of a propeller driven human powered bicycle, or indirectly connect with extension means, such as cloth belts, which in turns connect with the eyes of the connecting bars. The inflatable airfoil is filled or partially filled with light gases which allow the inflatable airfoil to float in the air. Therefore there is no need for supports for the wing (the inflatable airfoil). The inflatable airfoil can also be sized such that majority of the dead weight of the devices shown in FIG. 26 can be counterbalanced by the buoyancy of the gases that fill the inflatable airfoil. Thus the user of the devices shown in FIG. 26 only needs to pedal to lift his/her own weight, forward travel of the apparatus including the airfoil providing lift. This makes possible the use of the apparatus of the invention as an ultra light aircraft.

In using the devices as shown in FIG. 26, a user firstly makes sure that the locking rods of the chain ring lockers penetrate and join together the chain rings and the driving plates such that the torque from the pedaling system can be transmitted onto the propeller and the rear wheel. The user then pedals the pedals. After a initial speed is reached, the propeller driven human powered bicycle will move in a stable manner, in a way just like that of an ordinary bicycle in operations. The rider then stops pedaling momentarily and meanwhile pulls the chain ring locker of the right side pedaling system away from the driving plate and the chain ring in turn, and lets the locking rods rest on the depressed areas of the chain ring. Then the rider can continuously do the pedaling, at which time, only the propeller will be continuously spinning but the rear wheel will no longer supply the driving power. Then only the propeller drives the devices. As the speed of the apparatus increase, the aerodynamic forces acting on the inflatable airfoil will increase and eventually lift the devices and the user off the ground. The device then becomes an ultra light aircraft.

The user can adjust the pedaling forces and frequencies to control the lift of the apparatus. The front wheel can be a hollow disk wheel used as a rudder for the devices, because the disk can deflect the air flows and make the devices turn. The user can also shift his/her position on the seat. This will shift the position of the center of gravity of the devices and the user. Due to the fact that the suspension lines are connected at four different locations of the main frame, the shifts of the center of gravity will help to change the pitches and rolls of the inflatable airfoil. This will provide additional means for the user to control the devices.

The telescoping handle bar and the seat mounting shell provide means for a user to adjust the distances between himself/herself and the pedals and the handles so that he/she can operate the invented devices comfortably.

Referring back to FIG. 27, the connections of the suspension lines with the propeller driven human powered bicycle are the same as those described for FIG. 26. In FIG. 27, two ailerons and four control lines are introduced. One end of each of the four control lines 148, two on the top side of each of the ailerons 147 and two on their bottom side, are connected to holes or other structure on the handle bar. The top two lines will pass through a series of control line passing rings (not shown for clarity purposes) and travel forwardly on the top surface of the airfoil segment. These two lines will pass through the pulleys on the opposite side front connecting bars and then connect on the handle bar. The bottom two lines will travel directly from the aileron to pass through the pulleys on their corresponding side front connecting bars and connect with the handle bar. In this connection way, when the handle bar is pushed left, the handle bar will pull the top control line of the left aileron while release its bottom control line. This action will cause the left aileron to bend upwards. At the same time, the top control line of the right aileron will be released while its bottom control line is tightened. This action will cause the right aileron to bend downwards. The bending upwards of the left aileron and bending downwards of the right aileron will cause the inflatable airfoil to roll in a counterclockwise direction. Meanwhile, the airflow will push the front wheel rightwards. Together with the ailerons and the front wheel which acts as a rudder, making coordinated turns in air for the devices shown in FIG. 27 becomes possible. The inflatable airfoil then can be used as an ultra light aircraft with ailerons.

The propeller driven human powered bicycle can have auxiliary torque supply devices which will help to turn the propeller. The auxiliary torque supply devices can include an electric motor mounted on the gear system of the pedal power transmitting system. The auxiliary torque supply device can be an engine mounted on the gear system of the pedal power transmitting system. The auxiliary torque supply devices will have their own power/fuel supplies and control means mounted on the main frame.

The propeller driven human powered bicycle may have more than one pedaling system, one pedal power transmitting system, one seat, and one harness system so that multiple users can ride in tandem.

Referring to FIG. 31, a floating system 229 is mounted onto a propeller driven human powered bicycle so that it can be used on water surfaces. The floating system consists of a front float system 251, a rear float system 252, and a brake system 245.

The front float system comprises a front float 231, a front float-mounting platform 235, and a front float-mounting frame 236. The front float is a cylinder-like body with the front float-mounting platform mounted on its top. The front float-mounting platform is a plate with sockets 243 mounted on its top. The front float-mounting frame in general is an "H"-shaped rigid frame. There are holes on each end of the four legs of the front float-mounting frame, used for mounting of the front float-mounting frame. One of the top two ends of the front float-mounting frame is inserted into the frontal part insert 180 of the front wheel support 160 of the propeller driven human powered bicycle. The other end of the upper two ends of the front float-mounting frame is mounted on the front wheel mounting hole 181 of the propeller driven human powered bicycle. The bottom two ends of the front float-mounting frame are inserted into the sockets of the front float-mounting platform. All of the insertions are fastened in places with bolts, nuts and washers.

The rear float system 252 comprises of a right float 232, a left float 233, a rear float-mounting platform 234, a rear float front mounting frame 237 and a rear float rear mounting frame 238. The right float and the left float are cylinder-like, with the rear float-mounting platform mounted on its top. The rear float-mounting platform is a "D"-shaped plate with many sockets 244 on its top. The rear float front mounting frame comprises an inverted, twisted, generally "U"-shaped frame and a rod. There are holes at the ends of the rod and the ends of the legs of the "U"-shaped frame. There is also a hole on the middle of the "U"-shaped frame. The "U"-shaped frame is mounted onto the tube of the main frame of the propeller driven human powered bicycle by a bolt, a nut and washers 239. The bolt penetrates the hole in the middle of the "U"-shaped frame and the frontal part insert hole 183 (FIG. 28). One end of the rod is inserted into the part holder 187 of the main frame and the other end is inserted into one of the sockets of the rear float-mounting platform. The two legs of the "U"-shaped frame are inserted into two other sockets. The rear float rear mounting frame is generally an inverted "U"-shaped frame with a hole in the middle, and at each end of the two legs. The rear float rear mounting frame is mounted onto the main frame by a bolt, a nut and washers 240. The bolt penetrates the rear part insert hole 184 (FIG. 28) and the middle hole of the "U"-shaped frame. The ends of the two legs of the "U"-shaped frame are inserted into the sockets on the rear float-mounting platform. All of the insertions are secured in place by bolts, nuts and washers.

The brake system 245 comprises a pedal link 248, two pedals 250, and two brake anchors 246. The pedal link is "U"-shaped plate with a gap, the pedal gap 249, in the middle. The pedals are plates mounted on the tips of the two legs of the pedal link. There is a hole on one end of each of the pedals. The brake anchor comprises a socket 242, an anchoring rod 241, and a spring 247. The socket is mounted on top of the rear float-mounting platform. The anchoring rod has an enlarged portion at one end and a hole at the other end. The anchoring rods penetrate the holes of the pedals as well as the centers of the springs, and have their ends inserted into the sockets. The insertions are secured in place by bolts, nuts and washers. The enlarged end of the anchoring rods keep the pedals from being pushed away from the brake anchors by the springs. The springs push the pedal link up above water. The pedal gap prevents the pedal link from interfering with the movements of the chains 224 (FIG. 28).

The uses of the devices shown in FIG. 31 are different from those of the devices shown in FIG. 28. Since the devices shown in FIG. 31 are over water, and the wheels will not be in the water, the main forces to move the bicycle are provided by pedaling, and by the push or the pull of the propeller. Because the wheels will be above water, the brake system which works on the wheel will not aid the slowing down or braking of the bicycle. The brake system 245 is therefore provided. During a normal operation of the bicycle, the springs 247 of the brake anchor will push the pedals 250 to their highest positions. However, when the user needs to provide braking to the devices in motion, the user pushes the pedal 250 of the brake system downward. This in turn pushes a portion of the pedal link 248 into the water, which provides additional drag to the devices. A braking action is therefore provided to the devices.

The turns of the front wheel will turn the front float, which will change the directions of the devices shown in FIG. 31. The devices shown in FIG. 31 can be connected with an inflatable airfoil as shown in FIGS. 26 and 27. The combined device then becomes an ultra light floatplane.

Referring to FIG. 32, a sled system 253 can be mounted onto a propeller driven human powered bicycle so that it can be used on ground covered with snow. The sled system comprises a front sled system 254, a rear sled system 255, and a brake system 256. The front sled system comprises a front sled 257 and a front sled-mounting platform 258. The front sled is tray-like sled and has sockets 259 mounted on its top. The front sled-mounting frame is the same as the front float-mounting frame of the devices shown in FIG. 31. The front sled-mounting frame is mounted on the front wheel support of the propeller driven human powered bicycle. The front sled-mounting frame is inserted into the sockets of the front sled. The insertions are fixed in places with bolts, nuts and washers.

The rear sled system 255 comprises a sled plate 260, a rear sled front mounting frame 263 and a rear sled rear mounting frame 264. The sled plate has a tilt-up front end and many mounted sockets 261. The rear sled front mounting frame and the rear sled rear mounting frame are the same as the rear float front mounting frame and the rear float rear mounting frame, respectively, and their mountings onto the main frame are the same. The ends of the legs of the rear sled front mounting frame and the rear sled rear mounting frame are inserted into the sockets on the sled plate. All of the insertions are secured in place by bolts, nuts and washers. There is a slot, the brake slot 262, on the sled plate.

The brake system 256 is the same as the brake system of the devices shown in FIG. 31. The brake system is mounted on the sled plate in a manner similar to that for the devices shown in FIG. 31. The pedal link of the brake system 256 is over the brake slot 262 of the sled plate.

The uses of the devices shown in FIG. 32 are different from those devices shown in FIG. 28. Since the devices shown in FIG. 32 will be over snow covered ground, and the wheels will not touch the snow, the main forces to move the bicycle are provided by pedaling and by the push or the pull of the propeller. Because the wheels will be above snow, the brake system which works on the wheel will not help for slowing down or braking of the bicycle. The brake system 256 is therefore provided. During a normal operation of the bicycle, the springs of the brake anchor will push the pedals and the pedal link 265 away from the slot of the sled plate. However, when the user needs to provide braking to the devices in motion, the user will push downward the pedal of the brake system. This in turn pushes the tip of the pedal link into the snow of ground. This in turn also provides additional drag to the devices, and braking action is therefore provided.

Turning of the front wheel turns the front sled, which will change the direction of the device shown in FIG. 32. The devices shown in FIG. 32 can be connected to an inflatable airfoil in the manner shown in FIGS. 26 and 27. The combined device then becomes an ultra light airplane which can take off or land on snow.

Referring to FIG. 33, in lieu of the almost continuous plate of the sled plate 260 shown in FIG. 32, the sled plate of the rear sled system can be modified to include skids 266. The latter may optionally have many holes for anchoring other auxiliary components. The devices shown in FIG. 33 also have a front sled system and a brake system which are substantially the same as those of FIG. 32, the only difference of these two systems between the two devices is in the pedal link of the brake systems. The pedal link of the brake system shown in FIG. 33 has a semi-circular notch 277 on its bottom rim.

The uses of the devices shown in FIG. 33 are the same as those of the devices shown in FIG. 32.

Referring to FIG. 34, the devices as shown in FIG. 33 can be equipped with floats 267 that are mounted on the skids, the sled plate and the front sled by means of various types of clamps 268. In this way, the devices shown in FIG. 33 can be used on water. Furthermore, a rudder/support 269 can be mounted on the bottoms of the clamps for the front sled. A pair of hydrofoils 270 can be mounted near the tip of the rudder/support. The rudder/support basically is a plate with mounting means to connect with the clamps above and the hydrofoil below. Two sets of struts 271 and 272 can be installed underneath some of the clamps and two additional hydrofoils 273 and 274 can be installed at the tips of the struts. This will convert the devices shown in FIG. 33 into a hydrofoil. The rudder/support will act as a rudder for the devices shown in FIG. 34.

Because the floats of the hydrofoil shown in FIG. 34 will be lifted off the water when the hydrofoil is in adequate motion, the brake system for the devices shown in FIGS. 31, 32 or 33 will no longer be functional during the motion. A modified brake system thus is provided. Referring to FIGS. 34 and 35, the modified brake system 278 comprises a pedal link 279, two pedals 280, two brake anchors 281, an oar 282, and an oar anchoring system 283. The pedal link is "U"-shaped plate with a gap, the pedal gap 284, in the top middle edge. There is a semi-circular notch 277 in the bottom middle edge and a hook 285 is at the middle bottom of the pedal link. The semi-circular notch and the hook encompass an elongated circular area. The hook can be turned on its anchoring axis. The pedals are plates mounted on the top tips of the two legs of the pedal link. There is a hole on one end of each of the pedals. The brake anchor consists of a socket 286, an anchoring rod 287, and a spring 288. The socket is mounted on the top of the skid. The anchoring rod has an enlarged portion at one end and a hole at the other end. The anchoring rods penetrate the holes of the pedals as well as the centers of the springs and have their ends inserted into the sockets. The insertions are secured in place by bolts, nuts and washers. The enlarged end of the anchoring rods will keep the pedals from being pushed away from the brake anchors by the springs. The pedal gap prevents the pedal link from interfering with the movements of the chains 224 (also referring to FIG. 28).

The oar anchoring system 283 consists of a platform 289 and two oarlocks 290. The platform is a plate mounted on the two skids in front of the pedal link. There is about a 10-inch gap between the pedal link and the edge of the platform. The oarlocks are two "C"-shaped hooks with connection rods 291 which are mounted underneath the platform. The two oarlocks are mounted about six inches apart with the opening of the "C"-shape hook facing forwards. The oar consists of a blade 292, a shaft 293, and a grip 294. The blade is mounted on one end of the shaft and the grip is on the other end. The grip is a short bar mounted at its middle on an end of the shaft. Normally, the oar's shaft penetrates the elongated circular area encompassed by the hook 285 and the semi circular notch 277. The shaft lays on the hook. The elongate circular area is about one and half times long of the diameter of the shaft of the oar. The hook is about a half diameter of this of the shaft. The hook will not be able to turn when the shaft is resting on the hook, because the shaft and the pedal link will restrict the movement of the hook. The grip 294 rests in the oarlocks with the shaft staying in between the two oarlocks. The springs push the pedal link up which in turn pushes the oar into a roughly horizontal position. This will keep the brake system above water.

When a brake action is needed, for example while the floats are lifted above water during rapid movements of the devices shown in FIG. 34, the user pushed the pedals 280 downward. The pedal link then will push down the oar. Because the grip of the oar is inside the oarlocks, the grip will become the pivot of the oar. The blade of the oar will be pushed into the water and will cause added drag for the devices, and braking action then will take place. When the user's feet are raised off the pedals, the springs of the brake system will push the oar up to its original position.

A user can also take the oar off the brake system when the device is floating above water. In doing so, the user firstly lifts the oar up so that its shaft touched the semi circular notch, and the bottom of the shaft will then be cleared off the tip of the hook 285. The gap between the pedal link and the edge of the platform enables the user's hands to reach the shaft and the hook. Then the user turns the hook 90 degrees. The oar then can be moved forward so that the grip comes out of the openings of the "C"-shaped oarlocks. The user can take the oar out and use the oar as an ordinary oar.

The floats of the devices shown in FIG. 34 can be inflatable because the forces from the hydrofoils will not be directly exerted on the floats. A variation of the devices shown in FIG. 34 is shown in FIG. 36. In this variation, the floats are rigid, whereby the hydrofoils and their associated components can be mounted directly onto the floats or onto platforms which are mounted on the bottoms of the floats.

The uses of the devices shown in FIGS. 34 and 36 are similar to those of a hydrofoil. When the devices are connected with the aforementioned inflatable airfoils, the devices then become ultra light floatplanes.

In FIG. 37, a buoyant airfoil of the type seen in FIGS. 1–3, has larger and smaller tubes which comprise lengthwise extending multiple sections 54' and 54a', separated by panels 354 which extend chordwise. The gas filled interiors 355 and 355a of the sections do not communicate with the interiors of other sections. Therefore, accidental gas leakage from, or deflation of, any one or tow sections will not substantially reduce or affect the stability of the entire airfoil, as during forward travel.

I claim:

1. In an aeronautical apparatus, the combination comprising
   a) a primary airfoil, having at least one panel which is one of the following:
      i) an upper panel
      ii) a lower panel,
   b) multiple gas containing tubes associated with the airfoil and extending lengthwise thereof,
   c) said airfoil having opposite ends, and including chordwise extending structures at said opposite ends and connected to one or more of the following:
      i) the upper panel
      ii) the lower panel
      iii) ends of the tubes,
   d) said structures projecting generally forwardly of a line defined by the generally lengthwise extending leading edge of the airfoil, and said structures also projecting generally rearwardly of a line defined by the generally lengthwise extending trailing edge of the airfoil,
   e) and including a flight control surface located rearwardly of the airfoil and extending transversely relative to said structures.

2. The combination of claim 1 wherein the positioners are smaller cross-section tubes spaced apart about at least some of the larger cross section tubes, to form a truss-like structure and provide airfoil stability.

3. The combination of claim 2 wherein at least some of the smaller diameter tubes are connected to at least some of the larger diameter tubes.

4. In an aeronautical apparatus, the combination comprising
   a) a primary airfoil, having at least one panel which is one of the following:
      i) an upper panel
      ii) a lower panel,
   b) multiple gas containing tubes associated with the airfoil and extending lengthwise thereof,
   c) said tubes including
      i) relatively larger cross-section tubes positioned chordwise of the airfoil,
      ii) relatively smaller cross-section positioners located to stabilize said relatively larger cross-section tubes,
   d) and wherein the airfoil has opposite ends, and including chordwise extending structures at said opposite ends and connected to one or more of the following:
      i) the upper panel
      ii) the lower panel
      iii) ends of the relatively larger cross-section tubes
      iv) ends of the relatively smaller cross-section positioners.

5. The combination of claim 4 wherein said structures contain gas.

6. The combination of claim 4 wherein said structures project generally forwardly of a line defined by the generally lengthwise extending leading edge of the airfoil.

7. The combination of claim 6 wherein said structures also project generally rearwardly of a line defined by the generally lengthwise extending trailing edge of the airfoil.

8. The combination of claim 4 wherein said structures have opposite ends characterized by at least one of the following:
   i) blunt ends
   ii) tapered ends.

9. The combination of claim 1 including tethers supported by said airfoil.

10. The combination of claim 7 including intermediate chordwise extending structure located between said airfoil opposite ends, and projecting forwardly and rearwardly of the airfoil.

11. The combination of claim 10 wherein said airfoil is configured to have swept-back V shape at opposite sides of the intermediate structure.

12. The combination of claim 1 including a flight control surface carried by said apparatus.

13. The combination of claim 7 including a flight control surface located rearwardly of the airfoil and extending transversely relative to said structures.

14. The combination of claim 13 wherein said flight control surface is one of the following:
   i) a panel or panels
   ii) a secondary airfoil or airfoils.

15. The combination of claim 14 including tethers supported by said primary airfoil and by said flight control surface.

16. The combination of claim 12 wherein said flight control surface is a rudder.

17. The combination of claim 1 wherein at least some of said tubes comprise tubular sections having gas filled compartmental interiors, there being walls in the tubes blocking gas flow communication between said interiors.

18. The combination of claim 2 wherein there are at least three of the small cross-section tubes about each of at least two of the larger cross-section tubes.

19. The combination of claim 18 wherein at least some of said tubes are substantially cylindrical.

20. The combination of claim 18 wherein at least some of the larger cross-section tubes are cylindrical, and at least some of the smaller cross-section tubes are cylindrical.

21. The combination of claim 1 wherein said tubes consist of flexible sheet material, and both larger cross-section tubes and smaller cross-section tubes extend proximate said at least one panel in supporting relation therewith.

22. The combination of claim 1 wherein the one panel is an upper panel, which is the only panel of the airfoil.

23. The combination of claim 13 including controls operatively connected to said control panel or panels to controllably tilt same.

24. The combination of claim 1 including a carrier located below the level of said airfoil, and at least one connector connecting the carrier to the airfoil.

25. The combination of claim 24 wherein said at least one connector comprises at least one tether.

26. The combination of claim 24 wherein the carrier is one of the following:
a) a seat for a human rider,
b) a wheeled vehicle,
c) a ski or skis,
d) a boat,
e) a skid or skids,
f) a boat hull and a hydrofoil or hydrofoils carried by the hull,
g) a float or floats,
h) a sled,
i) a bicycle.

27. The combination of claim 1 including propulsion apparatus operatively connected to the airfoil.

28. The combination of claim 27 wherein said propulsion apparatus comprises at least one of the following:
i) a propeller and a drive therefor,
ii) a rocket
iii) a ground surface engaging wheel or wheels and a drive therefor.

29. The combination of claim 27 wherein said propulsion apparatus comprises
i) a frame and a ground engaging wheel or wheels carried by the frame, and a drive therefore carried by the frame,
ii) a propeller and a drive therefore carried by the frame,
iii) tethers connecting the airfoil to the frame.

30. The combination of claim 29 including selection mechanism carried by the frame to enable operator selection of drive activation to the wheel or wheels, or drive actuation to the propeller.

31. The combination of claim 30 wherein said mechanism includes a clutch carried by a sprocket via which drive is selectively transmitted via a chain or chains.

* * * * *